(12) United States Patent
Wittenbrink et al.

(10) Patent No.: US 7,292,242 B1
(45) Date of Patent: Nov. 6, 2007

(54) CLIPPING WITH ADDITION OF VERTICES TO EXISTING PRIMITIVES

(75) Inventors: Craig M. Wittenbrink, Palo Alto, CA (US); Henry Packard Moreton, Woodside, CA (US); Douglas A. Voorhies, Menlo Park, CA (US); John S. Montrym, Los Altos Hills, CA (US); Vimal S. Parikh, Fremont, CA (US)

(73) Assignee: NVIDA Corporation, Santa Clara, CA (US)

( * ) Notice: Subject to any disclaimer, the term of this patent is extended or adjusted under 35 U.S.C. 154(b) by 236 days.

(21) Appl. No.: 10/917,093

(22) Filed: Aug. 11, 2004

(51) Int. Cl.
*G06T 15/40* (2006.01)

(52) U.S. Cl. .................. 345/421; 345/422; 345/581; 345/620; 345/622; 345/623; 345/624

(58) Field of Classification Search ............... 345/620, 345/422, 622, 581, 623, 624, 421
See application file for complete search history.

(56) References Cited

U.S. PATENT DOCUMENTS 6,052,129 A * 4/2000 Fowler et al. ............... 345/620

6,590,582 B1 * 7/2003 Eo .............................. 345/620
6,919,908 B2 * 7/2005 Munshi et al. .............. 345/620

OTHER PUBLICATIONS

Olano et al., "*Triangle scan conversion using 2D homogeneous coordinates*", Proceedings of the 1997 SIGGRAPH / Eurographics Workshop on Graphics Hardware (New York City, NY) ACM Press, 1997, pp. 89-96.
Segal et al., "*The OpenGL Graphics System A Specification*" (Version 1.2.1) Apr. 1, 1999 Silicon Graphics.

* cited by examiner

*Primary Examiner*—Kimbinh T. Nguyen
(74) *Attorney, Agent, or Firm*—Townsend and Townsend and Crew, LLP

(57) ABSTRACT

Clipping techniques introduce additional vertices into existing primitives without requiring creation of new primitives. For an input triangle with one vertex on the invisible side of a clipping surface, a quadrangle can be defined. The vertices of the quadrangle are the two internal vertices of the input triangle and two clipped vertices. For determining attribute values for pixel shading, three vertices of the quadrangle are selected, and a parameter value for an attribute equation is computed using the three selected vertices. For determining pixel coverage for the quadrangle, the three edges that do not correspond to the edge created by clipping are used.

21 Claims, 13 Drawing Sheets

CLIPPING WITH ADDITION OF VERTICES TO EXISTING PRIMITIVES

BACKGROUND OF THE INVENTION

The present invention relates in general to computer-based rendering systems and in particular to rendering techniques for clipping geometry by addition of vertices to existing primitives.

Three-dimensional (3D) rendering systems typically operate as pipelines. The pipeline receives geometry data in the form of primitives (usually lines and/or triangles) that represent various objects making up a scene. The primitives are generally defined by specifying vertices having spatial coordinates and other attributes, such as color components, texture coordinates, and the like. After a first pipeline stage transforms all of the objects to a common world coordinate system, the next pipeline stage transforms the objects to a viewing coordinate system, which is often expressed in 3D homogeneous (projective) coordinates (x, y, z, w), where all vectors (tx, ty, tz, tw) for t≠0 project to a single point (x/w, y/w, z/w) in 3D space. The viewing coordinate system typically has its origin at an eyepoint and a view direction coincident with the z axis; points with coordinate w<0 are "behind" the eyepoint. A screen plane parallel to the xy plane (usually at w=1) is defined, and the geometry is projected onto the screen plane by transforming to inhomogeneous screen coordinates (X, Y, Z). In some cases, the screen coordinates are defined in two dimensions as (X, Y) with the Z coordinate being saved as a vertex attribute. A rasterization algorithm defines a pixel array (raster) over a visible portion of the screen and determines which of the various primitives is visible at each pixel location on the screen so that pixels can be colored accordingly.

Projection of geometry onto the screen generally involves defining a viewable volume, e.g., so that objects located behind the eyepoint are not drawn. The viewable volume is typically identified by defining a view frustum that includes a near plane and a far plane (both parallel to the plane of the screen), as well as edge planes projected from the eyepoint that intersect the screen plane at approximately the edges of the raster. The near plane is generally defined to be somewhat in front of the eyepoint (e.g., at some w for which 0<w<1); the far plane is defined so as to exclude objects that are too remote from the eyepoint to be of interest. The edge planes can be used to exclude primitives (or portions thereof) that extend beyond the edges of the raster.

Often, the geometry includes primitives that extend partly into the view frustum and partly outside it. FIG. 1A illustrates a triangle 102 having vertices 104, 106, 108 that intersects a near plane 110 of a view frustum, as seen from the side. (An eyepoint 100 is shown for reference.) Shaded portion 112, which is outside the view frustum, should not be drawn by the rasterizer.

Clipping, illustrated in FIG. 1B, prevents shaded portion 112 from being drawn by eliminating it from the geometry provided to the rasterizer. In a typical implementation of clipping, two new vertices 114 and 115 are created where the edges of triangle 102 intersect near plane 110. Vertex creation generally involves computing new vertex coordinates, e.g., by finding the intersection of the edge and the clipping plane, and computing new values for any attributes, e.g., color component values, a Z value in 2D screen coordinates, e.g., by interpolation. Triangle 102 is then divided into two new triangles 116, 118, both of which are entirely contained within the visible volume defined by near plane 110. Triangles 116, 118 are each provided to the rasterizer. (Creation of two triangles is generally necessary as typical rasterizers and shaders are not configured to handle primitives with more than three vertices.) Thus, clipping removes the invisible portions of primitives to support correct rendering, but at the cost of creating additional geometry, which increases the processing power required at subsequent stages.

To avoid creating new primitives, "clipless" rasterizers have been developed. Clipless rasterizers use the homogeneous coordinates and avoid creating new vertices. One such rasterizer, described by Olano and Greer, defines an "external" triangle projection onto the screen plane for any triangle that has a vertex behind the eyepoint (w<0 in projective coordinates) and uses the external triangle to determine pixel coverage. FIGS. 1C-D illustrate this concept. FIG. 1C shows (in side view) a triangle 120 with a vertex 122 that is behind eyepoint 124. To rasterize triangle 120 using the Olano and Greer technique, vertices 126 and 128 (at positive w) are projected toward eyepoint 124 onto a screen plane 130 (at points 126' and 128', respectively), and vertex 122 (at negative w) is projected through eyepoint 124 and onto screen 130 at point 122'. The resulting triangle 132 is shown in a screen view in FIG. 1D. Triangle 132 is an external triangle, meaning that its edge equations are defined in such a manner that the rasterizer treats points in shaded region 134 as being inside triangle 132, while points in unshaded region 136 are treated as being outside triangle 132. Shaded region 134 does not have a defined upper boundary; the upper boundary is provided naturally by the edge of the raster. (This accurately reflects what the viewer at eyepoint 124 in FIG. 1C would see.)

A clipless rasterizer can be faster than clipping because no new primitives are created. Implementing clipless rasterizers, however, is complicated in part by the finite numerical precision available in typical graphics processing hardware, and significant errors can result when negative-w vertices (e.g., vertex 122 of FIG. 1C) are projected onto the screen plane.

It would therefore be desirable to provide clipping techniques that can eliminate points behind the eye without creating additional geometry.

BRIEF SUMMARY OF THE INVENTION

Embodiments of the present invention provide clipping techniques that introduce additional vertices into existing primitives without requiring creation of new primitives. For example, clipping a triangle to a plane may result in a clipped triangle with four vertices. The extra vertex can be hidden from the rasterizing and shading stages by suitable selection of edge equations for use in rasterization and vertices for attribute computation during shading. In one embodiment, given a clipped triangle with an extra vertex, three edges can be selected that will result in correct coverage determinations during rasterization, and any three of the four vertices can be selected for providing attribute values that can be used during shading.

According to one aspect of the present invention, a method is provided in a rendering pipeline for clipping an input triangle having three vertices to a first clipping surface that defines a first invisible region. Each of the three vertices is identified as being invisible or not invisible based on whether that vertex is in the first invisible region. In the event that exactly one vertex of the input triangle is invisible, a quadrangle is defined. The quadrangle has as vertices the two vertices of the input triangle that are not invisible and two clipped vertices, with each clipped vertex being located approximately at the intersection of the first clipping surface with one of the edges that terminates at the invisible vertex. Three vertices are selected from the four vertices of the quadrangle, and a parameter value for an attribute equation is computed using the three selected vertices. In some embodiments, an edge equation may be generated for each of three edges of the quadrangle, wherein the three edges include a first edge and a second edge that each include one of the clipped vertices and a third edge that joins the two vertices that are not invisible. These three edge equations may be used to determine pixel coverage. In some embodiments, defining a quadrangle may include computing a clipped attribute value for at least one of the clipped vertices. The clipped attribute value and the parameter value may be used to compute an attribute value for a pixel that is determined to be covered.

In some embodiments, the quadrangle may be clipped to a second clipping surface that defines a second invisible region. For example, each vertex of the quadrangle that is in the second region can be identified as being invisible. In the event that the exactly one vertex of the quadrangle is invisible, the quadrangle may be split into two polygons, the two polygons including a triangle, where the invisible vertex is a vertex of the triangle and is not a vertex of the other polygon. The triangle that includes the invisible vertex may be clipped.

According to another aspect of the present invention, a method is provided in a rendering pipeline for clipping an input triangle having three vertices to a clipping surface that defines an invisible region. Each of the three vertices is identified as being invisible or not invisible based on whether that vertex is in the invisible region. In the event that at least one vertex of the input triangle is invisible, a clipped vertex is defined for each edge of the input triangle that intersects the clipping surface. The clipped vertex is located approximately at an intersection point between the edge and the clipping surface. An interpolation parameter is computed for each clipped vertex as a function of distance along the edge from one of the vertices of the input triangle to the clipped vertex. In some embodiments, a parameter value for an attribute equation may be computed using a vertex of the input triangle other than the invisible vertex, the clipped vertices, and the interpolation parameter for each clipped vertex. In some embodiments, an edge equation may be generated for each of three edges of the triangle using the clipped vertices and a vertex other than the invisible vertex. These edge equations may be used to determine pixel coverage. In some embodiments, an attribute value for a pixel that is determined to be covered may be computed using the parameter value and an attribute value of an invisible vertex.

According to yet another aspect of the invention, a device for rendering an image from input geometry data including input triangles includes a clipping module, a setup module, a rasterizer, and an attribute assembly module. The clipping module is configured to receive the input triangles and to clip the received triangles to a first clipping surface that defines a first invisible region, thereby generating clipped primitives, wherein the clipped primitives include a quadrangle having four vertices. The setup module is configured to receive the clipped primitives and to generate three edge equations and an ordered list of three vertices for each clipped primitive, including the quadrangle. The rasterizer is configured to receive the three edge equations for each clipped primitive, including the quadrangle, and to determine pixel coverage based at least in part on the edge equations. The attribute assembly module is configured to generate a parameter value for an attribute equation from the ordered list of three vertices for each clipped primitive, including the quadrangle.

The following detailed description together with the accompanying drawings will provide a better understanding of the nature and advantages of the present invention.

DETAILED DESCRIPTION OF THE INVENTION

Embodiments of the present invention provide clipping techniques that introduce additional vertices into existing primitives without requiring creation of new primitives. For example, a triangle may be clipped to a near plane or other clipping surface defined such that points on one side of the surface are (at least potentially) visible and points on the other side are invisible. If the triangle has one invisible vertex (i.e., one vertex to the "invisible" side of the clipping surface), a four-vertex clipped triangle (referred to herein as a quadrangle) results. The extra vertex can be hidden from the rasterizing and shading stages by suitable selection of three edge equations for use in rasterization and three vertices for attribute computation during shading. For example, in the case of a quadrangle, three edges can be selected that will result in correct coverage determinations during rasterization (the fourth edge can be provided by the clipping surface itself), and any three of the four vertices can be selected for providing attribute values that can be used during shading. In one rendering pipeline implementation, rasterization and shading stages can process quadrangles created by clipping using the same hardware that processes triangles.

System Overview

Figure 1A:
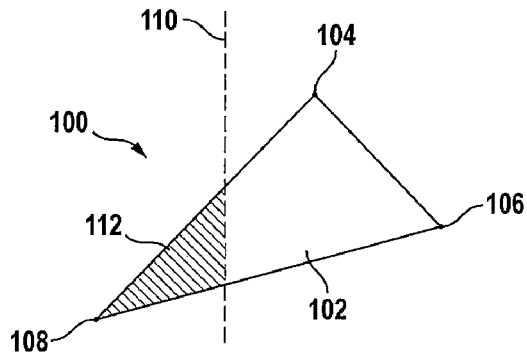
FIGS. 1A-D illustrate conventional approaches to handling triangles that extend inside the near plane, with FIG. 1A showing such a triangle, FIG. 1B illustrating a conventional clipping technique, and FIGS. 1C-D illustrating an external triangle technique.
Figure 1B:
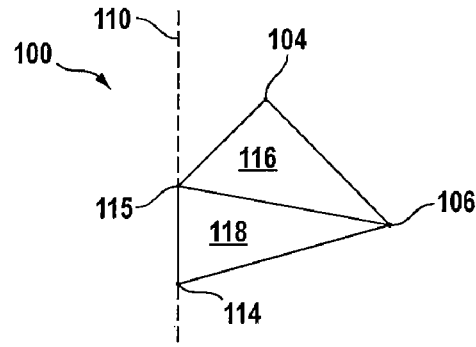
Figure 1C:
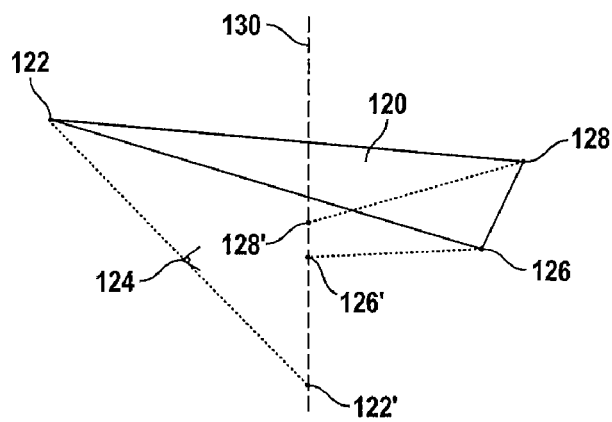
Figure 1D:
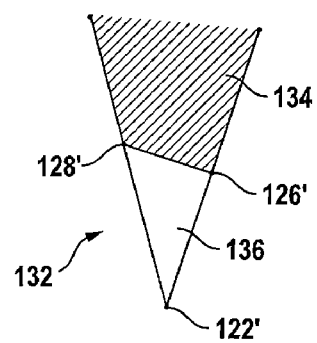
Figure 2:
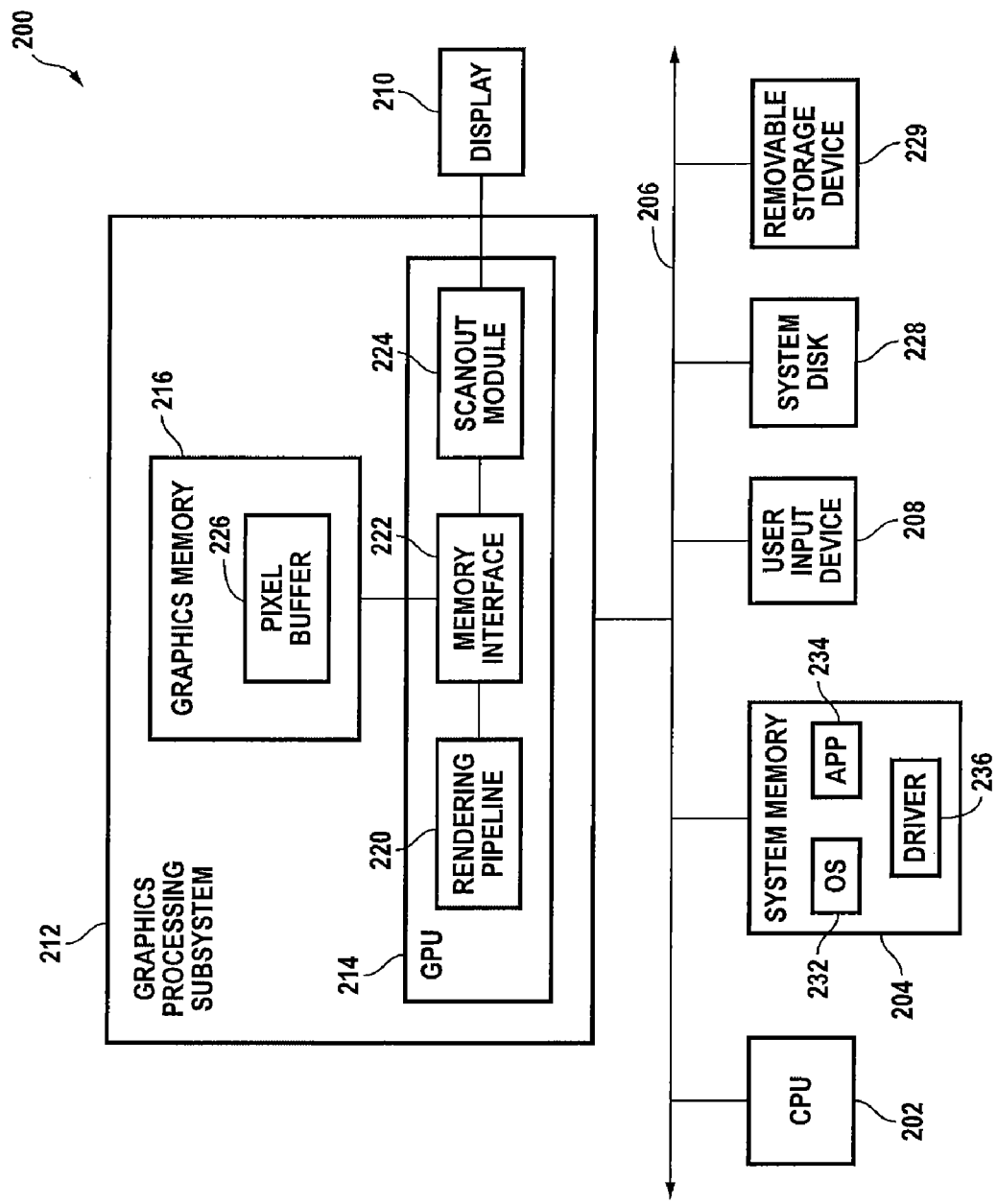
FIG. 2 is a block diagram of a computer system according to an embodiment of the present invention.

FIG. 2 is a block diagram of a computer system 200 according to an embodiment of the present invention. Computer system 200 includes a central processing unit (CPU) 202 and a system memory 204 communicating via a bus 206. User input is received from one or more user input devices 208 (e.g., keyboard, mouse) coupled to bus 206. Visual output is provided on a pixel based display device 210 (e.g., a conventional CRT or LCD based monitor) operating under control of a graphics processing subsystem 212 coupled to system bus 206. A system disk 228 and other components, such as one or more removable storage devices 229 (e.g., floppy disk drive, compact disk (CD) drive, and/or DVD drive), may also be coupled to system bus 206. System bus 206 may be implemented using one or more of various bus protocols including PCI (Peripheral Component Interconnect), AGP (Advanced Graphics Processing) and/or PCI-Express (PCI-E); appropriate "bridge" chips such as a north bridge and south bridge (not shown) may be provided to interconnect various components and/or buses.

Graphics processing subsystem 212 includes a graphics processing unit (GPU) 214 and a graphics memory 216, which may be implemented, e.g., using one or more integrated circuit devices such as programmable processors, application specific integrated circuits (ASICs), and memory devices. GPU 214 includes a rendering pipeline 220, a memory interface module 222, and a scanout module 224. Rendering pipeline 220 may be configured to perform various tasks related to generating pixel data from graphics data supplied via system bus 206 (e.g., implementing various 2D and or 3D rendering algorithms), interacting with graphics memory 216 to store and update pixel data, and the like. Rendering pipeline 220 is advantageously configured to generate pixel data from 2D or 3D scene data provided by various programs executing on CPU 202. Operation of rendering pipeline 220 is described further below.

Memory interface module 222, which communicates with rendering pipeline 220 and scanout control logic 224, manages all interactions with graphics memory 216. Memory interface module 222 may also include pathways for writing pixel data received from system bus 206 to graphics memory 216 without processing by rendering pipeline 220. The particular configuration of memory interface module 222 may be varied as desired, and a detailed description is omitted as not being critical to understanding the present invention.

Graphics memory 216, which may be implemented using one or more integrated circuit memory devices of generally conventional design, may contain various physical or logical subdivisions, such as a pixel buffer 226. Pixel buffer 226 stores pixel data for an image (or for a part of an image) that is read and processed by scanout control logic 224 and transmitted to display device 210 for display. This pixel data may be generated, e.g., from 2D or 3D scene data provided to rendering pipeline 220 of GPU 214 via system bus 206 or generated by various processes executing on CPU 202 and provided to pixel buffer 226 via system bus 206. In some embodiments, pixel buffer 226 can be double buffered so that while data for a first image is being read for display from a "front" buffer, data for a second image can be written to a "back" buffer without affecting the currently displayed image. Other portions of graphics memory 216 may be used to store data required by GPU 214 (such as texture data, color lookup tables, etc.), executable program code for GPU 214 and so on.

Scanout module 224, which may be integrated in a single chip with GPU 214 or implemented in a separate chip, reads pixel color data from pixel buffer 218 and transfers the data to display device 210 to be displayed. In one embodiment, scanout module 224 operates isochronously, scanning out frames of pixel data at a prescribed refresh rate (e.g., 80 Hz) regardless of any other activity that may be occurring in GPU 214 or elsewhere in system 200. In some embodiments, the prescribed refresh rate can be a user selectable parameter, and the scanout order may be varied as appropriate to the display format (e.g., interlaced or progressive scan). Scanout module 224 may also perform other operations, such as adjusting color values for particular display hardware and/or generating composite screen images by combining the pixel data from pixel buffer 226 with data for a video or cursor overlay image or the like, which may be obtained, e.g., from graphics memory 216, system memory 204, or another data source (not shown).

During operation of system 200, CPU 202 executes various programs that are (temporarily) resident in system memory 204. In one embodiment, these programs include one or more operating system (OS) programs 232, one or more application programs 234, and one or more driver programs 236 for graphics processing subsystem 212. It is to be understood that, although these programs are shown as residing in system memory 204, the invention is not limited to any particular mechanism for supplying program instructions for execution by CPU 202. For instance, at any given time some or all of the program instructions for any of these programs may be present within CPU 202 (e.g., in an on-chip instruction cache and/or various buffers and registers), in a page file or memory mapped file on system disk 228, and/or in other storage space.

Operating system programs 232 and/or application programs 234 may be of conventional design. An application program 234 may be, for instance, a video game program that generates graphics data and invokes appropriate rendering functions of GPU 214 (e.g., rendering pipeline 220) to transform the graphics data to pixel data. Another application program 234 may generate pixel data and provide the pixel data to graphics processing subsystem 212 for display. It is to be understood that any number of application programs that generate pixel and/or graphics data may be executing concurrently on CPU 202. Operating system programs 232 (e.g., the Graphical Device Interface (GDI) component of the Microsoft Windows operating system) may also generate pixel and/or graphics data to be processed by graphics card 212.

Driver program 236 enables communication with graphics processing subsystem 212, including both rendering pipeline 220 and scanout module 224. Driver program 236 advantageously implements one or more standard application program interfaces (APIs), such as Open GL, Microsoft DirectX, or D3D for communication with graphics processing subsystem 212; any number or combination of APIs may be supported, and in some embodiments separate driver programs 236 are provided to implement different APIs. By invoking appropriate API function calls, operating system programs 232 and/or application programs 234 are able to instruct driver program 236 to transfer geometry data or pixel data to graphics card 212 via system bus 206, to control operations of rendering pipeline 220, to modify state parameters for scanout module 224 and so on. The specific commands and/or data transmitted to graphics card 212 by driver program 236 in response to an API function call may vary depending on the implementation of GPU 214, and driver program 236 may also transmit commands and/or data implementing additional functionality (e.g., special visual effects) not controlled by operating system programs 232 or application programs 234. Various techniques for managing communication between driver program 236 and graphics processing subsystem 212 are known in the art and may be used, including asynchronous techniques.

It will be appreciated that the system described herein is illustrative and that variations and modifications are possible. A GPU may be implemented using any suitable technologies, e.g., as one or more integrated circuit devices. The GPU may be mounted on an expansion card that may include one or more such processors, mounted directly on a system motherboard, or integrated into a system chipset component (e.g., into the north bridge chip of one commonly used PC system architecture). The graphics processing subsystem may include any amount of dedicated graphics memory (some implementations may have no dedicated graphics memory) and may use system memory and dedicated graphics memory in any combination. In particular, the pixel buffer may be implemented in dedicated graphics memory or system memory as desired. The scanout circuitry may be integrated with a GPU or provided on a separate chip and may be implemented, e.g., using one or more ASICs, programmable processor elements, other integrated circuit technologies, or any combination thereof. In addition, the GPU may be incorporated into a variety of devices, including general purpose computer systems, video game consoles and other special purpose computer systems, DVD players, and the like.

Clipping to One Plane

Figure 3:
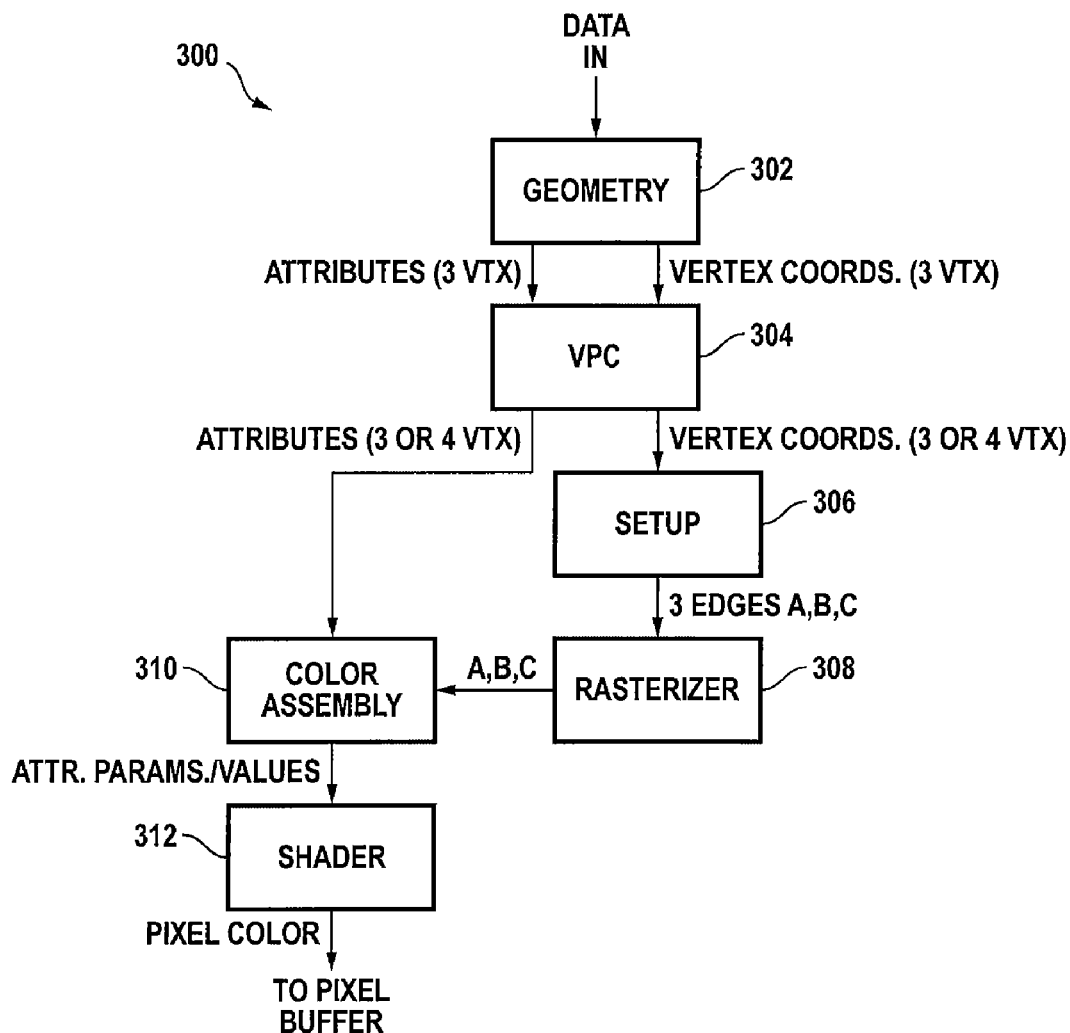
FIG. 3 is a block diagram of a rendering pipeline according to an embodiment of the present invention.

FIG. 3 is a block diagram of a 3D rendering pipeline 300 according to an embodiment of the present invention. Pipeline 300 may be implemented in rendering pipeline 220 in GPU 214 described above. Pipeline 300 includes a geometry block 302, a viewport and culling (VPC) block 304, a setup block 306, a rasterizer 308, a color assembly block 310, and a shader 312.

Geometry block 302, which may be of generally conventional design, receives a geometric representation of a 3D scene to be rendered. In one embodiment, the scene data includes a number of object definitions for objects (e.g., a table, a chair, a person or animal) that may be present in the scene. Each object is advantageously represented as a primitive (e.g., a triangle, a line, or a point) or a group of primitives by specifying vertex locations of the primitives in an object coordinate system. In addition to a location, each vertex also has various attributes associated with it. In general, attributes of a vertex may include any property that is specified on a per-vertex basis. In one embodiment, attributes include red, green, and blue color components; a transparency parameter; and texture coordinates relating the vertex location to a texture map.

Since each object may have its own coordinate system, additional data or commands are advantageously provided to position the objects relative to each other within a world coordinate system, e.g., by specifying a transformation matrix for each object from object coordinates to a common "world" coordinate system. The transformation matrix of an object is applied to each of its vertices. World coordinates are further transformed to a "clip space" in 3D homogeneous coordinates (x, y, z, w). The origin of the clip coordinate system is advantageously defined to coincide with an eyepoint, the z axis to coincide with the view direction, and the y axis to coincide with an "up" vector. The w axis is defined such that points with w>0 are in front of the eyepoint; points with w<0 are behind the eyepoint. In other embodiments, other coordinate systems may also be used.

Geometry block 302 is configured to transform the object coordinates of each vertex to clip coordinates (e.g., using conventional coordinate transformation operations) and may also perform other operations, such as lighting transformations, generation of shadow volumes, and the like; such operations may be performed in object, world, or clip coordinates as appropriate. Numerous examples of "per-vertex" operations that may be implemented in geometry block 302 are known in the art, and a detailed description is omitted as not being critical to understanding the present invention.

Geometry block 302 provides the transformed geometry data, in clip coordinates, to VPC block 304. In one embodiment, the transformed geometry data includes primitives such as triangles, lines, and points. Each triangle (line) is defined by specifying three (two) vertex locations in 3D homogeneous clip coordinates; as indicated in FIG. 3, in the case of triangles, geometry block 302 provides vertex coordinates and associated attributes for three vertices to VPC block 304. Groups of primitives may also be defined; for instance, a list of vertices describing a triangle strip or fan may be provided as known in the art, with some vertices being included in multiple triangles. In some embodiments, each vertex also includes a clip flag that indicates whether the vertex was created by clipping. This flag is advantageously initialized to a logical false state for vertices that were processed by geometry block 302.

VPC block 304 may further transform the primitives from clip coordinates to a screen (viewport) space, which is advantageously defined using 3D inhomogeneous coordinates (X, Y, Z), where the (X, Y) coordinates correspond to the pixel raster and Z is a depth coordinate along the viewing direction. In one embodiment, the transformation is defined by a scaling vector ($vs_x$, $vs_y$, $vs_z$) and an offset vector ($vb_x$, $vb_y$, $vb_z$), so that a point with clip coordinates (x, y, z, w) transforms to screen coordinates:

$$(X,Y,Z)=(vs_x,vs_y,vs_z) \bullet (x/w, y/w, z/w)+(vb_x,vb_y,vb_z), \qquad \text{(Eq. 1)}$$

where • denotes a vector dot product. Alternatively, the screen coordinates may be 2D inhomogeneous coordinates (X, Y) corresponding to the pixel raster for the image, with the Z (depth) coordinate of each vertex preserved as an attribute. In some embodiments, both the clip coordinates and the screen coordinates are kept for each vertex, enabling downstream components to use either (or both) coordinate systems as desired. In some embodiments, VPC block 304 may also transform attributes (e.g., by scaling attribute values by 1/w) as appropriate.

In some embodiments, VPC block 304 culls various primitives that are not visible. For example, primitives that are entirely outside the viewable volume (e.g., primitives where all vertices have w<0 in clip space) may be culled. As another example, VPC block 304 may cull any back-facing primitives; conventional techniques may be used for identifying such primitives. Culling reduces the number of primitives or vertices at downstream processing stages and can increase rendering speed.

In addition to culling, VPC block 304 clips primitives to one or more planes that define a visible volume such as a view frustum. Each clipping plane has a "visible" side and an "invisible" side, and portions of any primitives that are on the invisible side of any one clipping plane are clipped while portions of any primitives that are on the visible side of all clipping planes are retained. The effect of clipping can be different for different types of primitives. For instance, in some embodiments, point primitives are treated as either invisible or visible and are not clipped (although they may be culled); in other embodiments, point primitives have a defined size and may be clipped. When a line primitive is clipped, VPC block 304 replaces the invisible vertex (i.e., the vertex that is on the invisible side of the clipping plane) with a new clipped vertex located at the intersection of the clipping plane with the line. Since the clipped line still has two vertices, lines can always be clipped without creating new primitives; accordingly, clipping of lines is not described further herein.

When a triangle is clipped, VPC block 304 removes each invisible vertex and adds pairs of clipped vertices as described below. In the case of clipping to one plane, VPC block 304 can clip triangles without creating new primitives. Where triangles are clipped to multiple planes (e.g., to six planes of a view frustum), VPC block 304 may create additional primitives.

Figure 4:
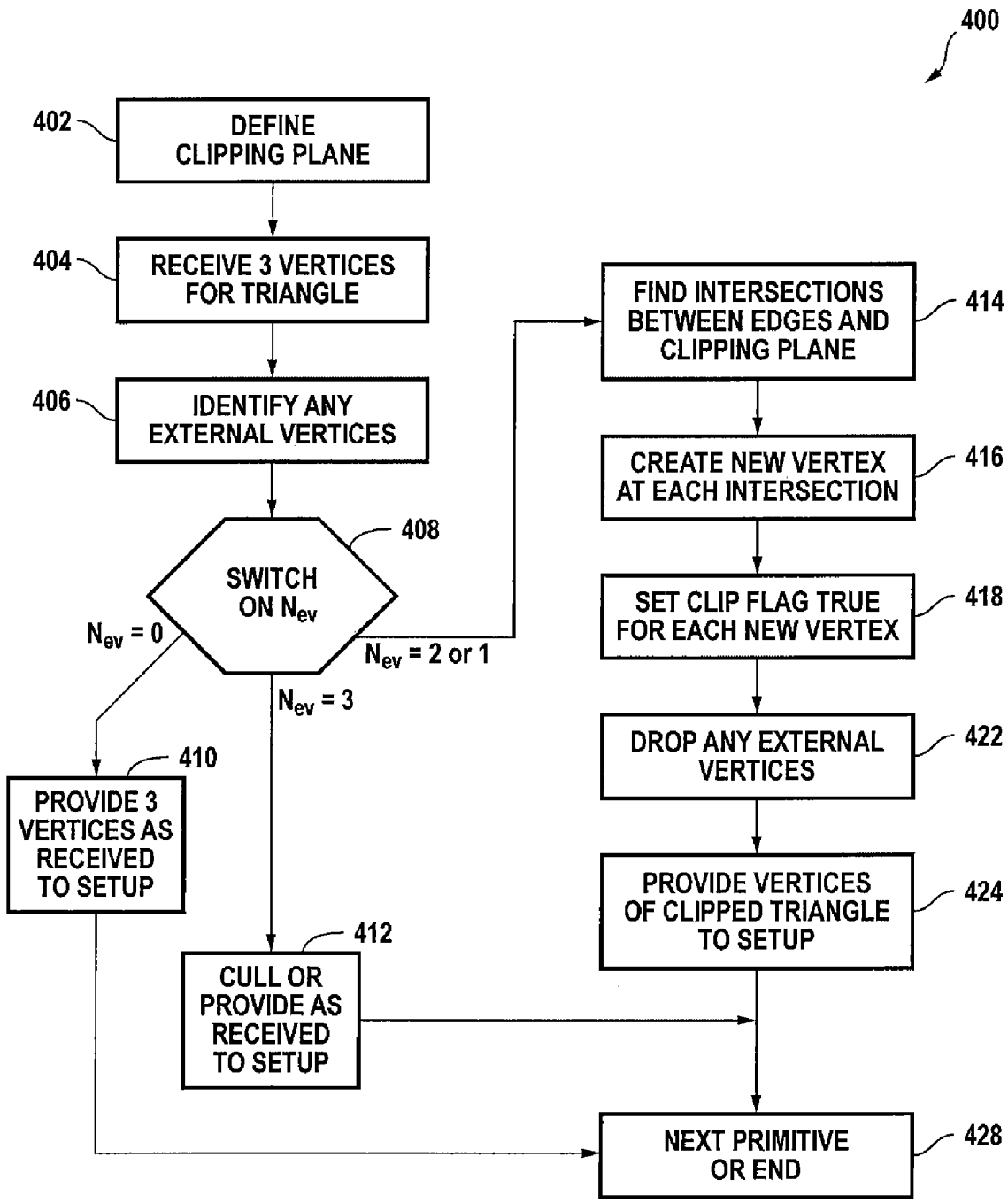
FIG. 4 is a flow diagram of a clipping process according to an embodiment of the present invention.

FIG. 4 is a flow diagram of a process 400 for clipping triangles to one clipping plane (e.g., the near plane) that may be implemented in VPC block 304; extensions of this process to multiple clipping planes are described below. In process 400, the clipping plane divides the clip space into an invisible region that contains only invisible geometry and a visible region that contains the visible geometry. Depending on how many vertices of the triangle are invisible (i.e., in the invisible region), process 400 provides either three or four vertices for the triangle to setup block 306.

More specifically, at step 402, a clipping plane is defined. The clipping plane divides the clip space into visible and invisible regions. It is to be understood that points in the visible region will not necessarily appear in a final image. For example, in embodiments described below where multiple clipping planes are used, points on the visible side of one clipping plane might be on the invisible side of another clipping plane. In addition, the clipping plane may be defined to provide a "guard band" such that some region outside the actual view frustum (or other view volume) is on the visible side of the clipping plane; as is known in the art, use of a guard band can reduce various clipping-related artifacts near the edges of a displayed image. Accordingly, as used herein, the identification of vertices as "visible" or "invisible" refers to the two regions defined by a clipping plane or other clipping surface, not necessarily to whether the vertex will be present in the final image.

In one embodiment, the clipping plane corresponds to a "near plane" defined such that the invisible region contains the eyepoint. Any primitives (or portions thereof) that are in the invisible region are not to be drawn. In some embodiments, a clipping plane may be defined by specifying a threshold z or w value. Alternatively, the clipping plane can be defined by any plane equation in the clip coordinate space. In some embodiments, it is not critical whether the clipping plane exactly matches a boundary of the view frustum, as long as all of the geometry that is within the view frustum is in the visible region defined by the clipping plane.

At step 404, the three vertices of a triangle are received. At step 406, any invisible vertices are identified. Conventional techniques may be used to assign each vertex to the visible or invisible side of the clipping plane. For instance, the clipping plane may be defined by a plane equation $ax+by+cz+d=0$ such that vertices for which $ax+by+cz+d<0$ are invisible while all other vertices are visible.

FIGS. 5A-I illustrate possible outcomes of step 406 for various triangles clipped to a plane 501 defined such that the invisible side is to the left in the drawings. (Invisible portions of triangles are shown shaded.) Triangle 500 in FIG. 5A has no invisible vertices; triangle 510 in FIG. 5B has one invisible vertex 512; triangle 520 in FIG. 5C has two invisible vertices 522 and 524; and triangle 530 in FIG. 5D has three invisible vertices 532, 534, 536. It should be noted that triangle 508 is completely invisible; in some embodiments, such a triangle would be culled prior to process 400, as mentioned above. FIGS. 5E-I are special cases involving triangles with one or more vertices in the clipping plane ("in-plane" vertices), which are advantageously classified as visible vertices at step 406. Thus, triangles 540 and 550 in FIGS. 5E and 5F have no invisible vertices; triangles 560 and 570 in FIGS. 5G and 5H each have one invisible vertex 562, 572, respectively, and triangle 580 in FIG. 5I has two invisible vertices 582, 584.

Step 408 is a switch on the number of invisible vertices ($N_{iv}$). If the triangle has no invisible vertices (e.g., the triangles in FIGS. 5A, 5E, 5F), then the three received vertices are provided without modification to subsequent processing stages (step 410). If the triangle has three invisible vertices (e.g., triangle 508 in FIG. 5D), then the triangle is not visible and may be either culled or provided without modification to subsequent stages (step 412), as desired. In either case, process 400 then proceeds to the next primitive or ends (step 428). If the triangle has one or two invisible vertices (e.g., the triangles in FIGS. 5B, 5C, 5G, 5H, or 5I), then clipping is performed.

Figure 5A:
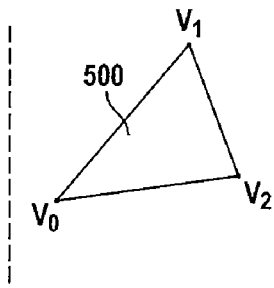
FIGS. 5A-I illustrate triangles with different numbers of invisible vertices.
Figure 5B:
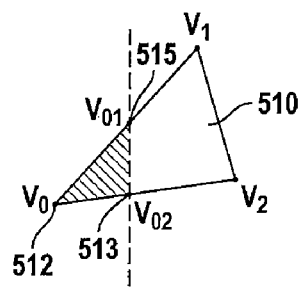
Figure 5C:
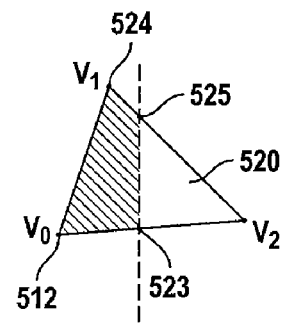
Figure 5D:
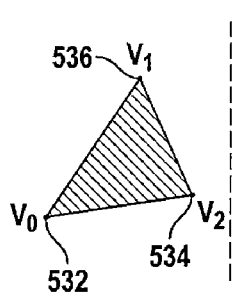
Figure 5E:
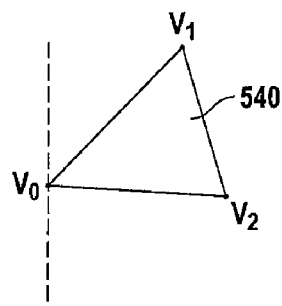
Figure 5F:
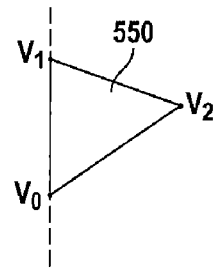
Figure 5G:
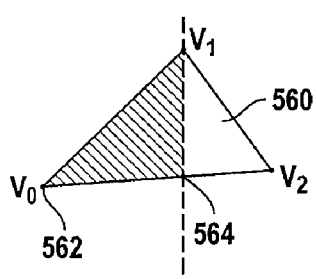
Figure 5H:
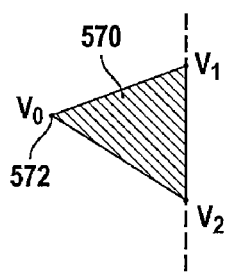
Figure 5I:
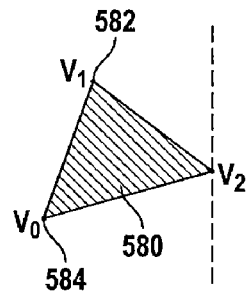

To clip the triangle, at step 414, new intersection points between edges of the triangle and the clipping plane are identified. For triangles that do not have in-plane vertices, two new intersection points are found. FIG. 5B illustrates new intersection points 513, 515 for a triangle 504 with one invisible vertex 512, and FIG. 5C illustrates new intersection points 523, 525 for a triangle 506 with two invisible vertices 522, 524. Where the triangle has one or more in-plane vertices, fewer than two new intersection points may be identified. FIG. 5G illustrates that one new intersection point 564 is found for triangle 560, and FIGS. 5H and 5I illustrate that no new intersection points are found for triangles 570, 580 that have only in-plane and invisible vertices. Thus, anywhere from zero to two new intersection points may be identified at step 514.

At step 416, a new "clipped" vertex is created for each new intersection point. Depending on implementation, creating a clipped vertex may include defining a new vertex data object or inserting data for the clipped vertex into a data stream. The vertex data for the clipped vertex includes the coordinates of the new vertex, which can be computed, e.g., using conventional techniques for finding coordinates of the intersection of a line and a plane. In addition, new attribute values are computed at each intersection point. In one embodiment, for triangle 504 of FIG. 5B, an attribute value for each attribute U at new vertex $V_{01}$ is computed by linear interpolation as:

$$U(V_{01})=p*U(V_1)+(1-p)*U(V_0),\qquad \text{(Eq. 2)}$$

where $U(V_0)$ and $U(V_1)$ are the attribute values at the original vertices and $p=d(V_0, V_{01})/d(V_0,V_1)$ is the ratio of the distance from vertex $V_0$ to intersection point $V_{01}$ ($d(V_0, V_{01})$) to the total distance from vertex $V_0$ to vertex $V_1$ ($d(V_0, V_1)$), where the distances are advantageously measured in clip space. Attribute values for vertex $V_{02}$ or any other clipped vertex may be computed similarly. It will be appreciated that other techniques may also be used.

In some embodiments, the intersection point may be approximated to simplify computation of attribute values. For example, in Eq. 2 above, it may be desirable to constrain p to be a number of the form $\frac{1}{2}^N$ for an integer exponent N>0; this can simplify computations implemented using binary arithmetic logic circuits. An appropriate value of exponent N can be selected by computing the respective exponents of $d(V_0, V_1)$ and $d(V_0, V_{01})$ and setting N equal to the difference between the two exponents. An approximately interpolated vertex can then be identified along the line from $V_0$ to $V_1$ at a distance $p=\frac{1}{2}^N$ from vertex $V_0$. Since the distance between vertices $V_0$ and $V_1$ is always greater than the distance between $V_{01}$ and $V_1$, it can be guaranteed that N will not be negative. (It should be noted that embodiments where approximations are used for the intersection point advantageously include a rasterizer and a scissor function capable of properly handling unclipped geometry that extends out of the viewable volume; examples of these elements are known in the art.)

At step 418, the clip flag for each clipped vertex is advantageously set to true, to indicate that the triangle has been clipped, and to distinguish the clipped vertices created at step 416 from visible vertices received from geometry block 302.

At step 422, the invisible vertex (or vertices) are advantageously dropped from the geometry data, and at step 424, the remaining vertices are provided as a single clipped triangle to setup block 306. For triangle 520 of FIG. 5C, the two invisible vertices 522, 524 are, in effect, replaced by the two clipped vertices 523, 525, so the resulting clipped triangle has three vertices. For triangle 510 of FIG. 5B, one invisible vertex 512 is dropped and two clipped vertices 513, 515 are added, so the resulting clipped triangle has four vertices. A clipped triangle with four vertices is referred to herein as a "quadrangle. For triangle 560 of FIG. 5G, vertex 562 is dropped, leaving a clipped triangle with three vertices 564, 566, 568. For triangle 570 of FIG. 5H, the clipped triangle is a line with endpoints at vertices 574, 576. For triangle 580 of FIG. 5I, the clipped triangle is a point at vertex 586. After providing the resulting primitive to setup, process 400 proceeds to the next primitive or ends (step 428).

It will be appreciated that the clipping process described herein is illustrative and that variations and modifications are possible. Steps described as sequential may be executed in parallel, order of steps may be varied, and steps may be modified or combined. Triangle-processing steps of process 400 may be repeated to clip any number of triangles to a single clipping plane; examples of clipping to multiple planes are described below. In embodiments where triangles may be provided as strips or fans of vertices, with multiple triangles sharing some vertices, the invisible/visible determination for each received vertex may be cached to avoid redundant computation. Any clipped vertices (including attribute values) that are created during process 400 may also be cached for reuse.

Referring again to FIG. 3, VPC block 304 provides vertex coordinates for each primitive (point, line, triangle or quadrangle) resulting from process 400 to setup block 306. The attributes associated with the vertices are not used by setup block 306 and may be bypassed to color assembly block 310 as shown. For lines, triangles, and quadrangles, setup block 306 computes edge equations for use by rasterizer 308 and provides ordered vertex lists for computing attribute parameters (or attribute values) for pixels covered by the primitive to color assembly block 310. For points, setup block 306 simply provides the point's coordinates to rasterizer 308 and color assembly block 310. For lines, an equation of the line between the two vertices is provided to rasterizer 308, and the two vertices are provided to color assembly block 310.

Figure 6:
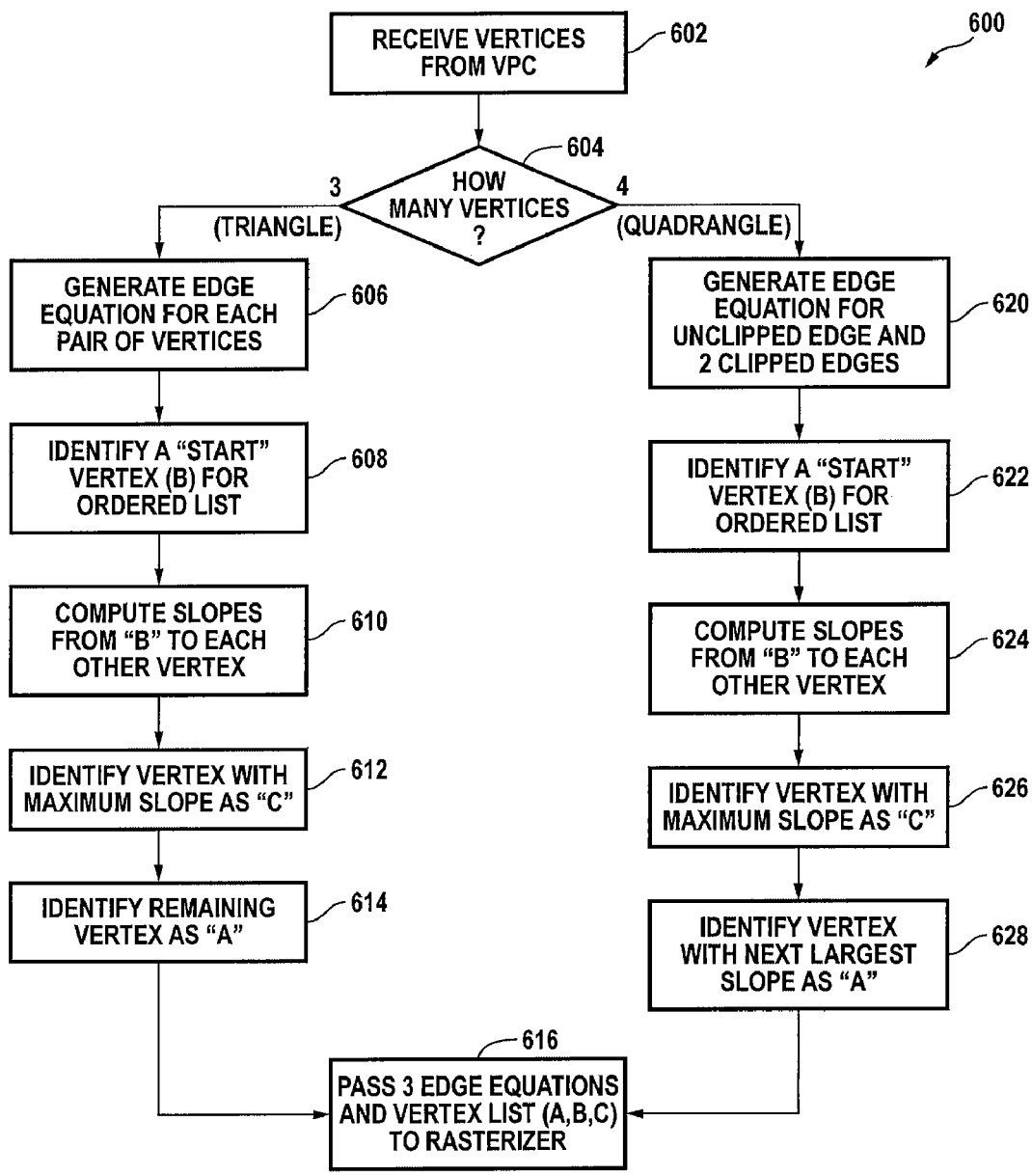
FIG. 6 is a flow diagram of a process for edge equation computation and vertex selection for primitives according to an embodiment of the present invention.

For both triangles and quadrangles, setup block 306 provides three edge equations and an ordered list of three vertices. FIG. 6 is a flow diagram of a process 600 for edge equation computation and vertex ordering that may be implemented in setup block 306. For triangles, process 600 uses all three vertices; for quadrangles, process 600 selects three of the four edges and three of the four vertices. (Processing of lines and points is straightforward and is not shown in process 600.)

More specifically, at step 602, the vertices for a primitive, which may be a triangle or a quadrangle, are received from VPC block 304. In this embodiment, the vertex coordinates are specified in the clip space used by VPC block 304. At step 604, it is determined whether the primitive has three vertices or four. It should be noted that three-vertex primitives may include any triangles that were not clipped as well as clipped triangles with three vertices.

Processing of a triangle by setup block 306 advantageously does not depend on whether it was clipped during process 400. At step 606, an edge equation for each pair of vertices is generated; these edge equations are for use by rasterizer 308 in determining coverage. Conventional techniques for generating such edge equations given two endpoint vertices may be used; in some embodiments, each edge equation is defined so as to distinguish an "outside" from an "inside," with points being inside the primitive only if they are inside all three edge equations.

An ordered list of vertices A, B, and C is also created; this list can be used by color assembly block 310 to generate a plane equation for interpolating attribute values for various points within the primitive. In this embodiment, the order of the list is generally independent of the order in which the vertices are provided to setup block 306, so that the same set of three vertices result in the same plane equation, regardless of the order in which setup block 306 receives the vertices. More specifically, at step 608, one of the three vertices is identified as a start vertex B. Selection of a start vertex can be done in various ways. For example, the distance from the coordinate system origin to each vertex may be computed, with the vertex closest to the origin being selected as vertex B. Next, slopes or deltas (e.g., $\Delta y$ and $\Delta x$) from the start vertex B to each of the two other vertices are computed (step 610), and the edge with the maximum slope is selected as the BC edge (step 612), thereby identifying vertex C. The remaining vertex (opposite the BC edge) is selected as vertex A (step 614). It is to be understood that other methods of ordering the vertices may be substituted, and in some embodiments, setup block 306 may simply use the order of receipt.

At step 616, the three edge equations and the ordered vertex list are provided to rasterizer 308. The edge equations are advantageously provided in the coordinate space appropriate to rasterizer 308 (described below), and the vertices are advantageously provided in coordinates appropriate to color assembly block 310.

Processing of quadrangles also involves providing three edge equations and an ordered list of three vertices A, B, and C to rasterizer 308. In this case, however, setup block 306 also selects among the four vertices received at step 602. Specifically, at step 620, edge equations are generated for the unclipped edge and the two clipped edges, but not for the fourth edge that joins the two clipped vertices.

Figure 7:
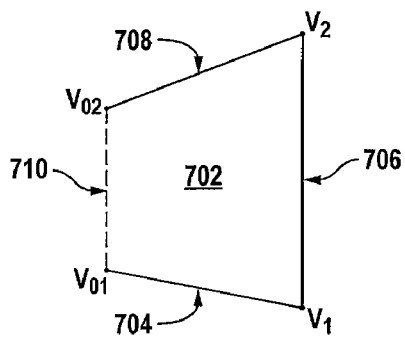
FIG. 7 illustrates a technique for selecting three edges of a quadrangle for computing edge equations according to an embodiment of the present invention.

FIG. 7 illustrates the selection of edges for a quadrangle 702. Vertices $V_{O1}$ and $V_{O2}$ were created by clipping process 400 described above and have vertex clip flags set to logical true, while vertices $V_1$ and $V_2$ are visible vertices and have their clip flags set to logical false. Using the clip flags, setup block 306 determines that edge equations should be generated for edges 704, 706, and 708, but not for edge 710 (dotted line), which joins the clipped vertices $V_{O1}$ and $V_{O2}$. In other words, vertex pairs $\{V_{O1}, V_1\}$, $\{V_1, V_2\}$, and $\{V_2, V_{O2}\}$ are each used to generate one of the three edge equations. As in the case of a triangle, conventional techniques may be used for computing the edge equations after the endpoint vertices are selected.

Figure 8A:
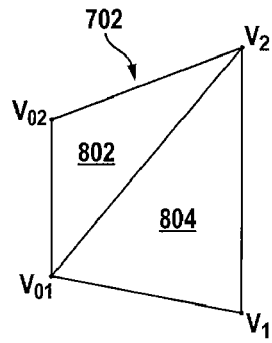
FIGS. 8A-B illustrate candidate triangles for use in selecting three vertices of a quadrangle according to an embodiment of the present invention.
Figure 8B:
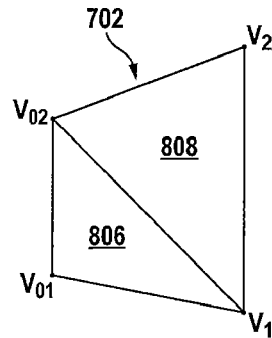

Three of the four vertices of the quadrangle are selected and ordered for use in attribute plane equations. In some embodiments, either or both of the clipped vertices may be selected. Accordingly, as illustrated in FIGS. 8A-B, there are four candidate triangles for quadrangle 702; FIG. 8A shows candidate triangles 802 and 804, and FIG. 8B shows candidate triangles 806 and 808.

Selection of a candidate triangle and ordering of its vertices can be done in various ways. Referring again to FIG. 6, in one embodiment, one of the four vertices is identified as a "start" vertex B (step 622). Selection of a start vertex can be done in various ways, e.g., by choosing the vertex closest to the origin as described above. Next, slopes or deltas (e.g., Δy and Δx) from the start vertex B to each of the two other vertices are computed (step 624), and the edge with the maximum slope or delta is selected as the BC edge (step 626), thereby identifying vertex C. As between the two remaining vertices, the one with the largest slope or delta is selected as vertex A (step 628). After three vertices are selected and ordered, at step 616, the three edge equations and the ordered vertex list are provided to rasterizer 308.

It will be appreciated that the setup process described herein is illustrative and that variations and modifications are possible. Steps described as sequential may be executed in parallel, order of steps may be varied, and steps may be modified or combined. The process described herein orders the vertex list such that it is independent of the order in which the vertices are provided to setup block 306; other embodiments may retain the received order or use other techniques for defining a new order independent of the order of receipt.

Other methods of selecting and ordering the vertices for a quadrangle may be substituted; for example, the areas of the four candidate triangles could be computed, and the triangle with the largest area could be selected. Vertices of the selected triangle could then be ordered in accordance with steps 608, 610, 612, 614 as described above. In other embodiments, setup block 306 may simply use the first three received vertices.

Referring again to FIG. 3, for each triangle or quadrangle, setup block 306 provides the three edge equations and the vertex list (A, B, and C) to rasterizer 308; in this embodiment, rasterizer 308 treats quadrangles as triangles. For each point, setup block 306 provides the point coordinates, and for lines, the line equation. Rasterizer 308 performs scan conversion on the received primitives. Scan conversion generally involves determining which primitive is visible at each pixel and providing the ordered vertex list for that primitive to color assembly block 310. Conventional scan-conversion algorithms for triangles, points and lines may be implemented.

Rasterizer 308 is advantageously configured such that its operation is not affected by whether or not any two of the three edges of a triangle intersect within the viewable area, so that quadrangles can be handled as triangles. For instance, for quadrangle 702 of FIG. 7, rasterizer 308 would receive edges 704 and 708 that do not intersect within the viewable area. A number of rasterizer designs known in the art (including clipless rasterizers) provide such a feature and may be implemented as rasterizer 308.

In one embodiment, rasterizer 308 is advantageously implemented as a "clipless" rasterizer that operates in clip coordinate space. In other embodiments, rasterizer 308 may operate in the screen coordinate space. In either case, the edge equations can be provided by setup block 306 in the appropriate coordinate space. In some embodiments, rasterizer 308 is capable of eliminating any geometry outside the viewable volume that was not clipped or culled by VPC block 304. Thus, the near clipping plane used in VPC block 304 need not coincide exactly with the edge of the viewable volume.

Color assembly block 310 associates the vertices received from rasterizer 308 with attributes (e.g., color components, texture coordinates) received from VPC block 304 and generates parameters for computing attribute values at points covered by the primitive. In the case of a point, rasterizer 308 provides one vertex, and the attributes of that vertex may be used without modification. In the case of a line, rasterizer 308 provides two vertices (the endpoints of the line), and parameters for linear interpolation of attribute values may be derived from attribute values at the two vertices.

In the case of a triangle (or quadrangle), rasterizer 308 provides three vertices A, B, C, and planar interpolation may be used. For example, at each of which an attribute U has known values at each vertex, and a planar function of screen coordinates (X, Y) may be defined as:

$$U = U(X_A, Y_A) + \frac{\partial U}{\partial X}(X - X_A) + \frac{\partial U}{\partial Y}(Y - Y_A), \quad \text{(Eq. 3)}$$

where $U(X_A, Y_A)$ is the (known) attribute value at vertex A (screen coordinates $(X_A, Y_A)$). Values of the partial derivatives $\partial U/\partial X$ and $\partial U/\partial Y$ can be determined by reference to known attribute values $U(X_B, Y_B)$ at vertex B and $U(X_C, Y_C)$ at vertex C using conventional algebraic techniques, e.g., inserting values for each of vertices B and C into Eq. 3 and solving the resulting system of two equations for the unknowns $\partial U/\partial X$ and $\partial U/\partial Y$. Thus, in one embodiment, the parameters generated by color assembly block 310 correspond to $\partial U/\partial X$, $\partial U/\partial Y$, and $U(X_A, Y_A)-(\partial U/\partial X) X_A-$ ($\partial U/\partial Y)Y_A$. Other representations of the function U(X, Y) and other parameters may also be used. A variety of computational techniques known in the art may be used for efficient generation of parameter values.

Figure 9A:
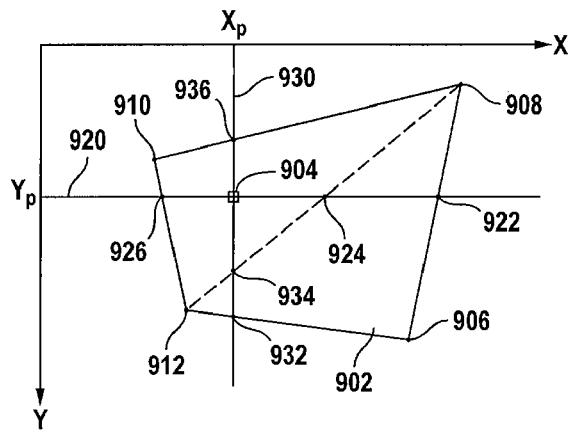
FIGS. 9A-C illustrate an extrapolation technique for computing attribute values at a point inside a quadrangle according to an embodiment of the present invention.
Figure 9B:
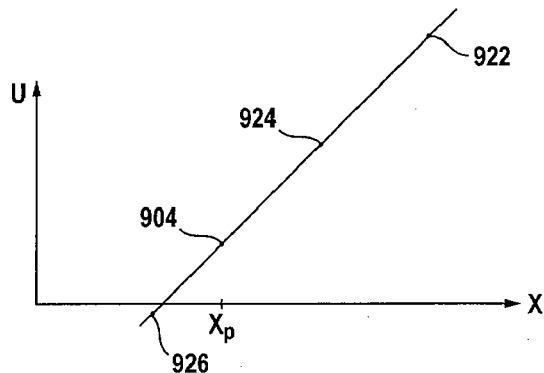
Figure 9C:
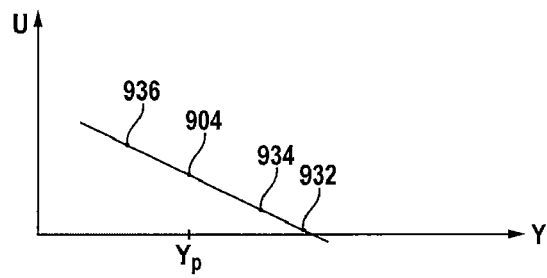

It should be noted that Eq. 3 may be applied regardless of whether the point (X, Y) is inside or outside the triangle defined by vertices A, B, C. Accordingly, given a triangle, color assembly module 310 can generate attribute parameters for all points inside a quadrangle, including points outside the triangle used to generate the attribute parameters. FIGS. 9A-C illustrate this principle. FIG. 9A shows a screen view of a quadrangle 902 that has vertices 906, 908, 910, 912. Three of these vertices (e.g., 906, 908, 912) are provided to color assembly block 310 as vertices A, B, C, respectively. Point 904 has screen coordinates $(X_P, Y_P)$ and is inside quadrangle 902 but outside triangle 914 defined by vertices 906, 908, 912. Point 904 is inside a triangle 915 defined by vertices 908, 910, 912 that could have been (but in this example was not) provided to color assembly block 310 instead of triangle 914. Reference lines 920 and 930 correspond to $Y=Y_P$ and $X=X_P$, respectively. Intersections of these lines with edges of triangles 914 and 915 are also indicated (points 922, 924, 926, 932, 934, 936).

FIGS. 9B and 9C are graphs illustrating the planar attribute function U(X, Y) along reference lines 920 and 930, respectively. As FIG. 9B shows, the value for $U(X_P, Y_P)$ at point 904 obtained by extrapolating along reference line 920 from points 922 and 924 is the same value that would be obtained by interpolating along reference line 920 between points 924 and 926 had triangle 915 been provided instead. Similarly, FIG. 9C shows that the value for $U(X_P, Y_P)$ obtained by extrapolating along reference line 930 from points 932 and 934 is the same value that would be obtained by interpolating between points 934 and 936 had triangle 915 been provided instead. Thus, so long as U is a planar function of position (X, Y), either triangle 914 or 915 provides sufficient information for determining attribute values for any point inside quadrangle 902. Accordingly, in this embodiment, color assembly block 310 does not require knowledge of whether a given point is inside a quadrangle or a triangle; the same attribute plane equation (e.g., Eq. 3 above) can be used.

The attribute parameters generated by color assembly block 310 are provided to shader 312. In some embodiments, color assembly block 310 may also use pixel coordinates provided by rasterizer 308 to determine attribute values for the pixel from the parameters and may supply attribute values instead of or in addition to attribute parameters.

Shader 312 uses the attribute parameters (and/or attribute values) to compute a pixel color that can be stored in a pixel buffer (e.g., buffer 226 of FIG. 2). Shader 312 may implement a variety of shading algorithms, including well-known algorithms such as Gouraud shading, Phong shading, texture blending, and the like. In some embodiments, a programmable shader 312 may be implemented and dynamically supplied with one or more shading algorithms. In some embodiments, operation of shader 312 may be unaffected by the type of primitive that covers a pixel. In other embodiments, shader 312 may implement different shading algorithms for points, lines, and triangles. In such embodiments, shader 312 might use the triangle shading algorithms for quadrangles, or it might implement a shading algorithm specific to quadrangles.

It will be appreciated that the rendering pipeline described herein is illustrative and that variations and modifications are possible. For example, the rasterizer may be implemented to process primitives with up to four edges, in which case four edge equations would be provided in the case of a quadrangle. Various operations are herein as being associated with specific functional blocks; it is to be understood that such associations are made for purposes of description and are not required. Those skilled in the art will recognize that other functional block decompositions are possible, and that order of rendering operations described herein may be varied.

Clipping to Multiple Planes

In some embodiments, process 400 can be adapted for clipping to multiple planes in a way that minimizes creation of new geometry. For example, it may be desirable to clip to both a near plane and a far plane, or to all six planes of a view frustum.

Figure 10A:
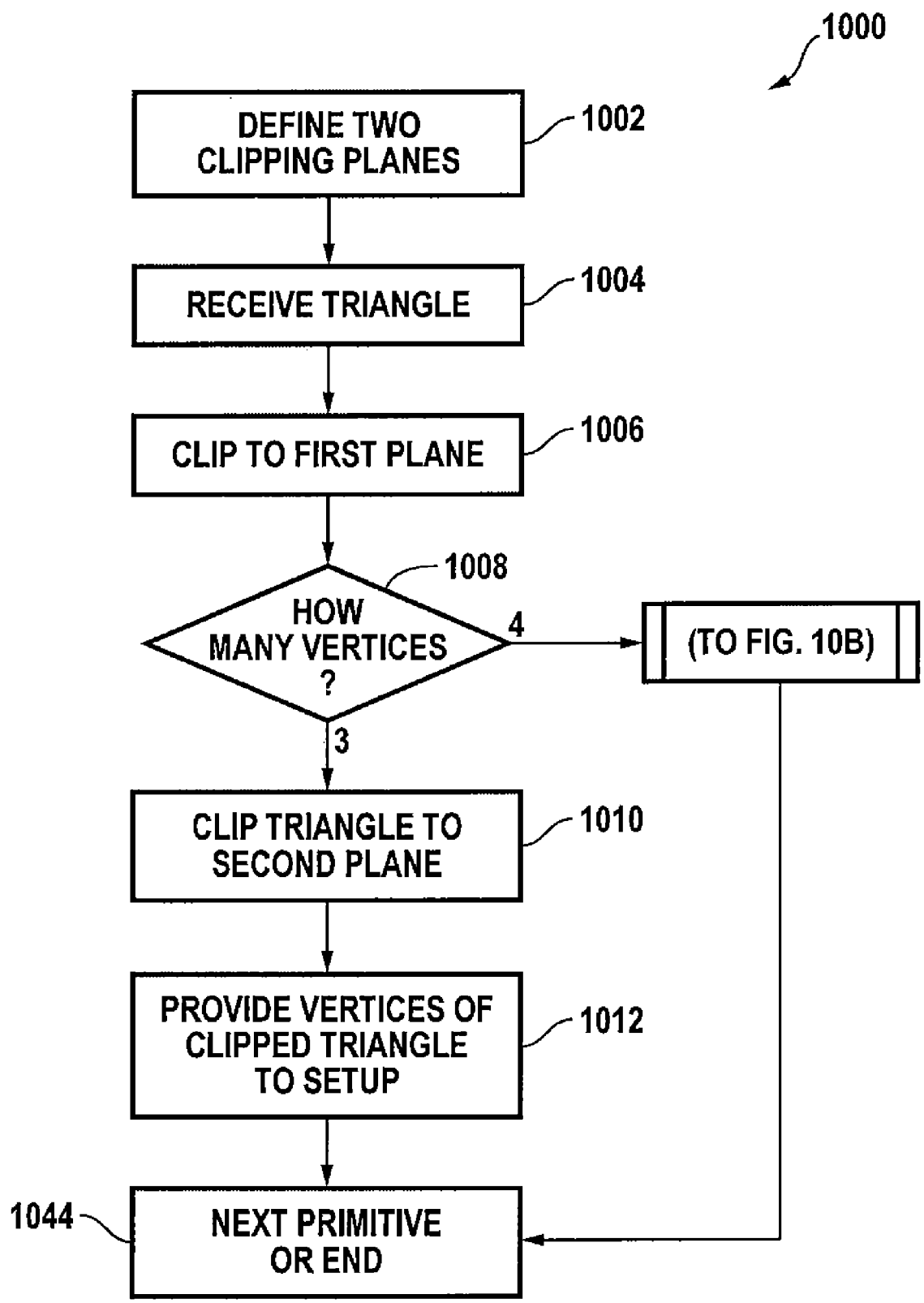
FIGS. 10A-B are flow diagrams of a process for clipping to two planes according to an embodiment of the present invention.
Figure 10B:
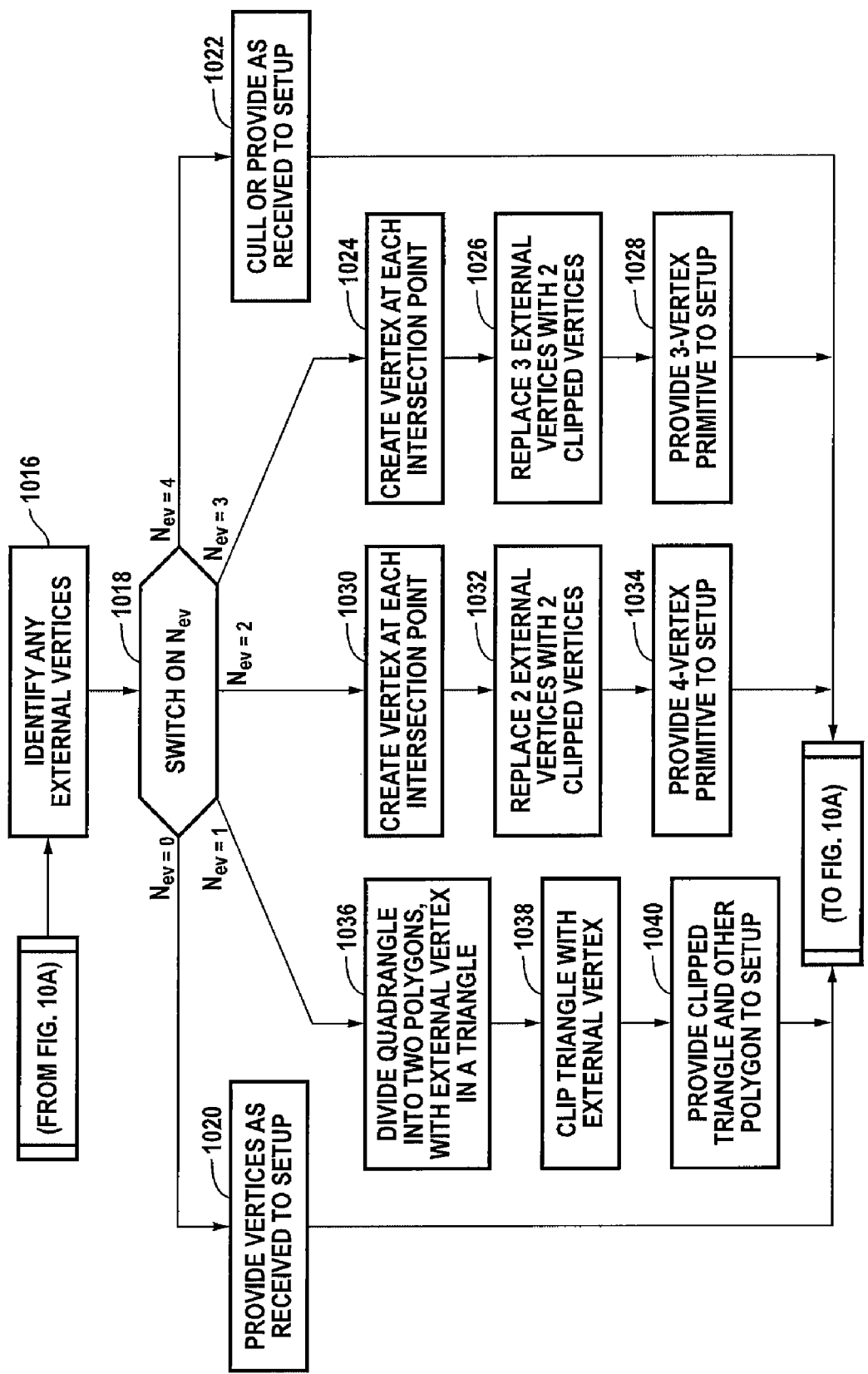

FIGS. 10A-B are flow diagrams of a process 1000 for clipping to two planes, e.g., a near plane and a far plane. At step 1002 (FIG. 10A), the two clipping planes are defined, e.g., by providing a plane equation for each plane in the appropriate coordinate space. As in process 400, each clipping plane is advantageously defined to have a visible side and an invisible side. As noted above, it is not critical whether the clipping planes exactly match boundaries of the view volume, and clipping planes may be defined such that some of the geometry on the visible side is actually not visible in the displayed image. Clipping planes are applied sequentially to the geometry, with the sequence being selected as desired (e.g., near plane first, then far plane).

At step 1004, a triangle is received. At step 1006, the triangle is clipped to the first plane. Clipping to the first plane may proceed according to process 400 of FIG. 4, resulting in either a triangle or a quadrangle. (As described above, a point or line might result if the triangle has one or more in-plane vertices; subsequent clipping of points and lines to a second plane is straightforward and for that reason this possibility is not shown in process 1000.)

Step 1008 is a switch on the number of vertices resulting from clipping to the first plane. In the case of a triangle (3 vertices), process 1000 proceeds to step 1010, where the triangle is clipped to the second plane. Clipping a triangle to a second plane may also proceed in accordance with process 400 of FIG. 4, resulting in a triangle or quadrangle (or possibly a point or line, in the case of triangles with in-plane vertices) that is passed to subsequent stages (e.g., setup block 306) at step 1012. Process 1000 then proceeds to the next primitive or ends (step 1044).

Figure 11A:
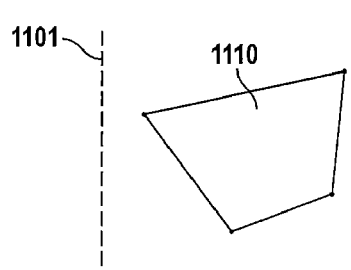
FIGS. 11A-E illustrate quadrangles with different numbers of invisible vertices.
Figure 11B:
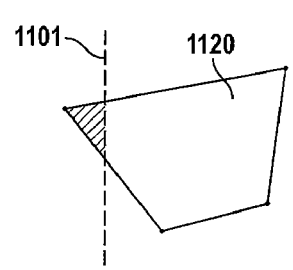
Figure 11C:
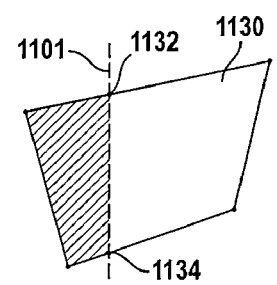
Figure 11D:
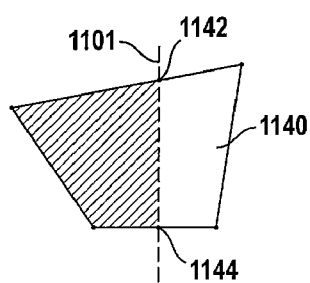
Figure 11E:
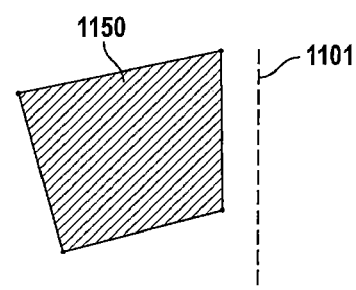

In the case of a quadrangle (4 vertices), process 1000 proceeds to step 1016 (FIG. 10B), where invisible vertices are identified by reference to the second clipping plane. FIGS. 11A-E illustrate quadrangles clipped to a plane 1101 defined such that the invisible side is to the left in the drawings. (Invisible portions of quadrangles are shown shaded.) Quadrangle 1110 in FIG. 11A has no invisible vertices; quadrangle 1120 in FIG. 11B has one invisible vertex; quadrangle 1130 in FIG. 11C has two invisible vertices; quadrangle 1140 in FIG. 11D has three invisible vertices; and quadrangle 1150 in FIG. 11E has four invisible vertices. It should be observed that, in any case other than one invisible vertex (FIG. 11B), clipping a quadrangle results in either a triangle (FIG. 11D) or a quadrangle (FIGS. 11A and 11C). Some quadrangles may have one or more in-plane vertices and one or more invisible vertices. Those of skill in the art will appreciate that clipping such quadrangles may result in a quadrangle, a line, or a point.

Accordingly, process 1000 creates new geometry (an additional primitive) only when a quadrangle with one invisible vertex is to be clipped.

Step 1018 is a switch on the number of invisible vertices ($N_{ev}$). If there are no invisible vertices (FIG. 11A), the quadrangle is passed unaltered to setup block 306 at step 1020. If there are four invisible vertices (FIG. 11E), the quadrangle is not visible and may be either dropped (culled) or provided without modification to subsequent stages, as desired (step 1022).

If there are three invisible vertices (FIG. 11D), then a new clipped vertex is created at each of the two intersection points 1142, 1144 at step 1024. Creation of a new vertex advantageously includes creation of attribute values for the new vertex, e.g., by linear interpolation as described above. Vertex clip flags for the clipped vertices may be set to logical true. At step 1026, the three invisible vertices are replaced by the two clipped vertices, and at step 1028 the resulting primitive (a triangle) is provided to setup block 306.

If there are two invisible vertices (FIG. 11C), then at step 1030, a new clipped vertex (with attribute values) is created at each of the two intersection points 1132, 1134. At step 1032, the two invisible vertices are replaced by the two new clipped vertices, and at step 1034, the resulting primitive (a quadrangle) is provided to setup block 306.

If there is one invisible vertex (FIG. 11B), creating two new clipped vertices and dropping the invisible vertex would result in a five-vertex polygon (pentagon), which would introduce additional complexity into setup block 306 and rasterizer 308. In this embodiment, rather than creating a pentagon, the quadrangle is divided into two polygons prior to clipping thereby, introducing one additional primitive.

Figure 12A:
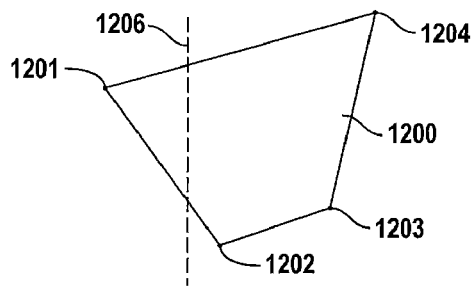
FIGS. 12A-C illustrate techniques for dividing a quadrangle with one invisible vertex according to an embodiment of the present invention, with FIG. 12A showing the quadrangle, FIG. 12B illustrating a technique for dividing the quadrangle into two triangles, and FIG. 12C illustrating a technique for dividing the quadrangle into a triangle and a quadrangle.

More specifically, at step 1036, the quadrangle is divided (split) into two polygons in such a way that the invisible vertex is part of a triangle and is not part of a quadrangle. Step 1036 may be implemented in a number of ways, examples of which will now be described with reference to FIGS. 12A-C. FIG. 12A illustrates a quadrangle 1200 with vertices 1201-1204. Clipping plane 1206 is defined such that vertex 1201 is invisible while vertices 1202-1204 are visible.

Figure 12B:
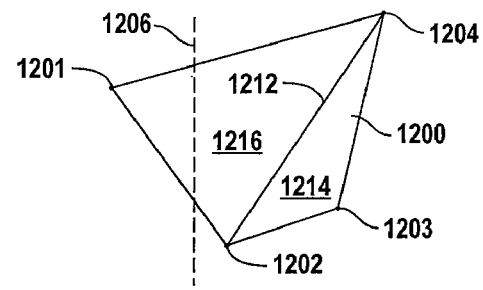

FIG. 12B illustrates one technique that may be used to divide quadrangle 1200 into two polygons, in this case two triangles. The two neighbor vertices 1202, 1204 of invisible vertex 1201 are identified and used as endpoints of a diagonal 1212 that divides quadrangle 1200 into triangles 1214 and 1216. Triangle 1214 has three visible vertices and does not require further clipping. Triangle 1216 has one invisible vertex and can be clipped to a quadrangle, e.g., in accordance with process 400.

Figure 12C:
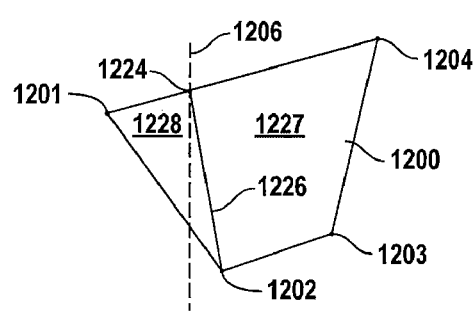

FIG. 12C illustrates an alternative technique that may be used to divide quadrangle 1200. An edge 1222 that connects invisible vertex 1201 to one of its neighbors (e.g., vertex 1204) is identified, and the intersection point 1224 of edge 1222 with clipping plane 1206 is identified. Intersection point 1224 and the other neighbor 1202 of vertex 1201 are used as endpoints of a line 1226 that divides the quadrangle 1200 into a quadrangle 1227 and a triangle 1228. Quadrangle 1227 has no invisible vertices and does not require further clipping. Triangle 1228 has one invisible vertex 1201 and one vertex 1224 that lies in clipping plane 1206. During clipping, vertex 1201 is replaced by a new vertex 1230, the resulting clipped primitive is a triangle.

It will be appreciated that other techniques for dividing quadrangle 1200 may also be implemented. To minimize the additional geometry, the division is advantageously made such that invisible vertex 1200 is part of a triangle and not part of a quadrangle.

Referring again to FIG. 10B, after the two new polygons have been created, at step 1038 the triangle with the invisible vertex is clipped. Clipping of this triangle is advantageously implemented according to process 400 (FIG. 4) and results in either a triangle or a quadrangle, depending on how the original quadrangle was divided at step 1036. For example, in the case of FIG. 12B, clipping of triangle 1216 would result in a quadrangle, while in FIG. 12C clipping of triangle 1228 would result in a triangle. At step 1040, two polygons (the triangle that was clipped at step 1038 and the other polygon that was created at step 1036) are provided to setup block 306. Thereafter, process 1000 proceeds to process the next primitive or quit (step 1044, FIG. 10A).

It will be appreciated that process 1000 is illustrative and that variations and modifications are possible. Steps described as sequential may be executed in parallel, order of steps may be varied, and steps may be modified or combined. Process 1000 may be repeated for any number of input triangles and any number of clipping planes. Each triangle may be clipped to all planes before processing the next triangle, or all triangles may be clipped to one plane before applying the next clipping plane. Additional geometry (primitives) would be created only when a quadrangle to be clipped was found to have one invisible vertex. Thus, the number of additional primitives created by clipping can be considerably reduced relative to conventional multi-plane clipping techniques. In another alternative embodiment, process 1000 might convert every quadrangle with one, two, or three invisible vertices to two triangles and clip the resulting triangles to triangles or quadrangles as appropriate.

Clipping without Computing New Attributes

In an alternative embodiment of the present invention, clipping can be done without creating new attributes when new vertices are created. Instead, vertices created by clipping (referred to as "clipped" vertices) include a single interpolation parameter that can be used to rescale attribute values of the original vertices in subsequent stages of the pipeline.

Figure 13:
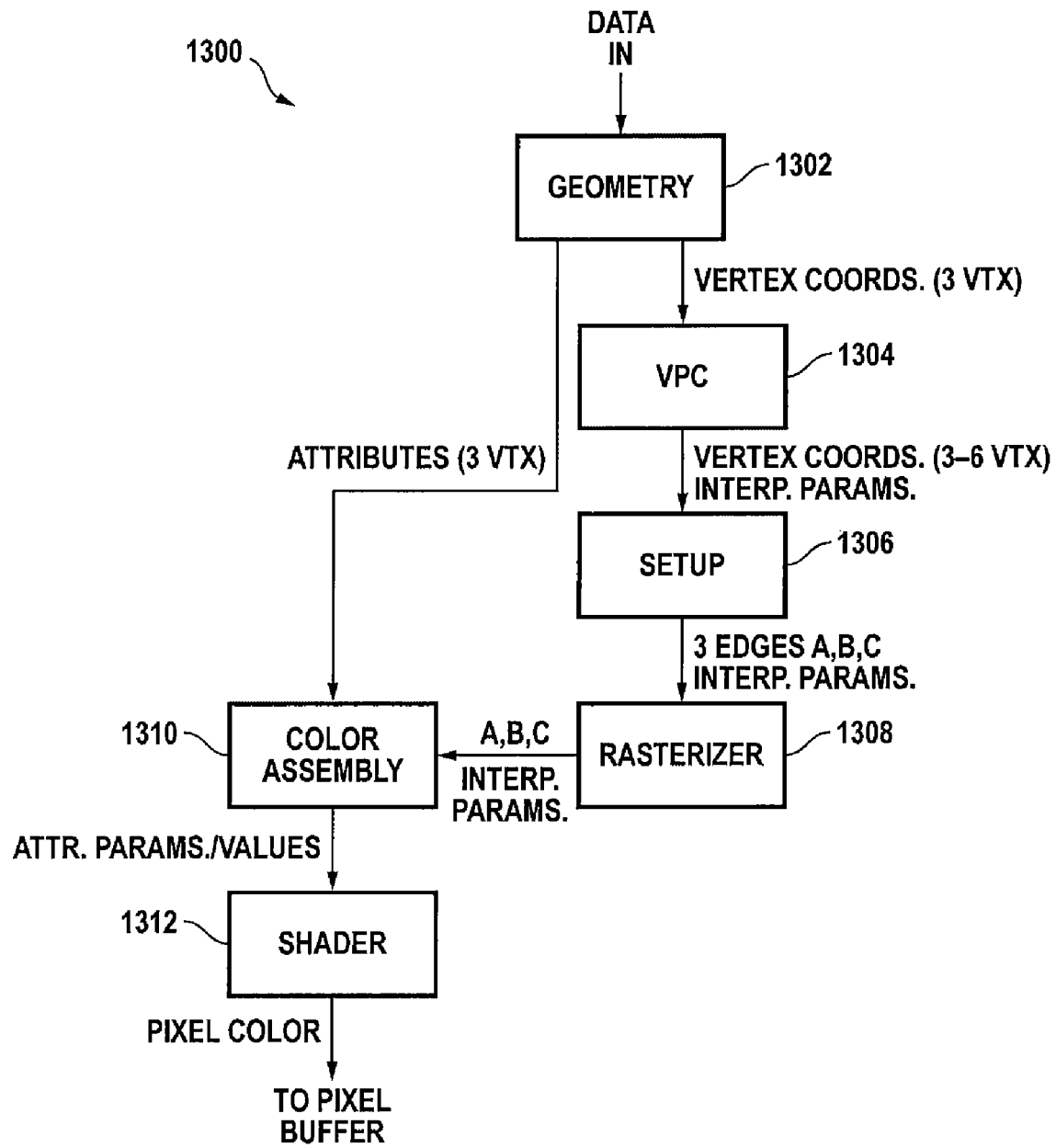
FIG. 13 is a block diagram of a rendering pipeline according to an alternative embodiment of the present invention.

FIG. 13 illustrates a rendering pipeline 1300 according to an alternative embodiment of the present invention. Rendering pipeline 1300, which may be implemented, e.g., in GPU 214 (FIG. 2), includes a geometry block 1302, a VPC block 1304, a setup block 1306, a rasterizer 1308, a color assembly block 1310, and a shader 1312. The various functional blocks and operations of rendering pipeline 1300 are generally similar to those of rendering pipeline 300 (FIG. 3) described above, except that during clipping, vertex attributes for clipped vertices are not computed in VPC block 1304. Instead, an interpolation parameter associated with each clipped vertex is computed and propagated with the clipped vertex as described below. Thus, for a triangle, VPC block 1304 may propagate coordinates for anywhere from three to six vertices, depending on how many clipping planes the triangle intersects, while only attributes from the original three vertices are propagated. Color assembly block 1310 uses the attributes from the original three vertices, screen coordinates of clipped vertices, and the interpolation parameters to generate attribute parameters or attribute values for use by shader 1312.

Figure 14:
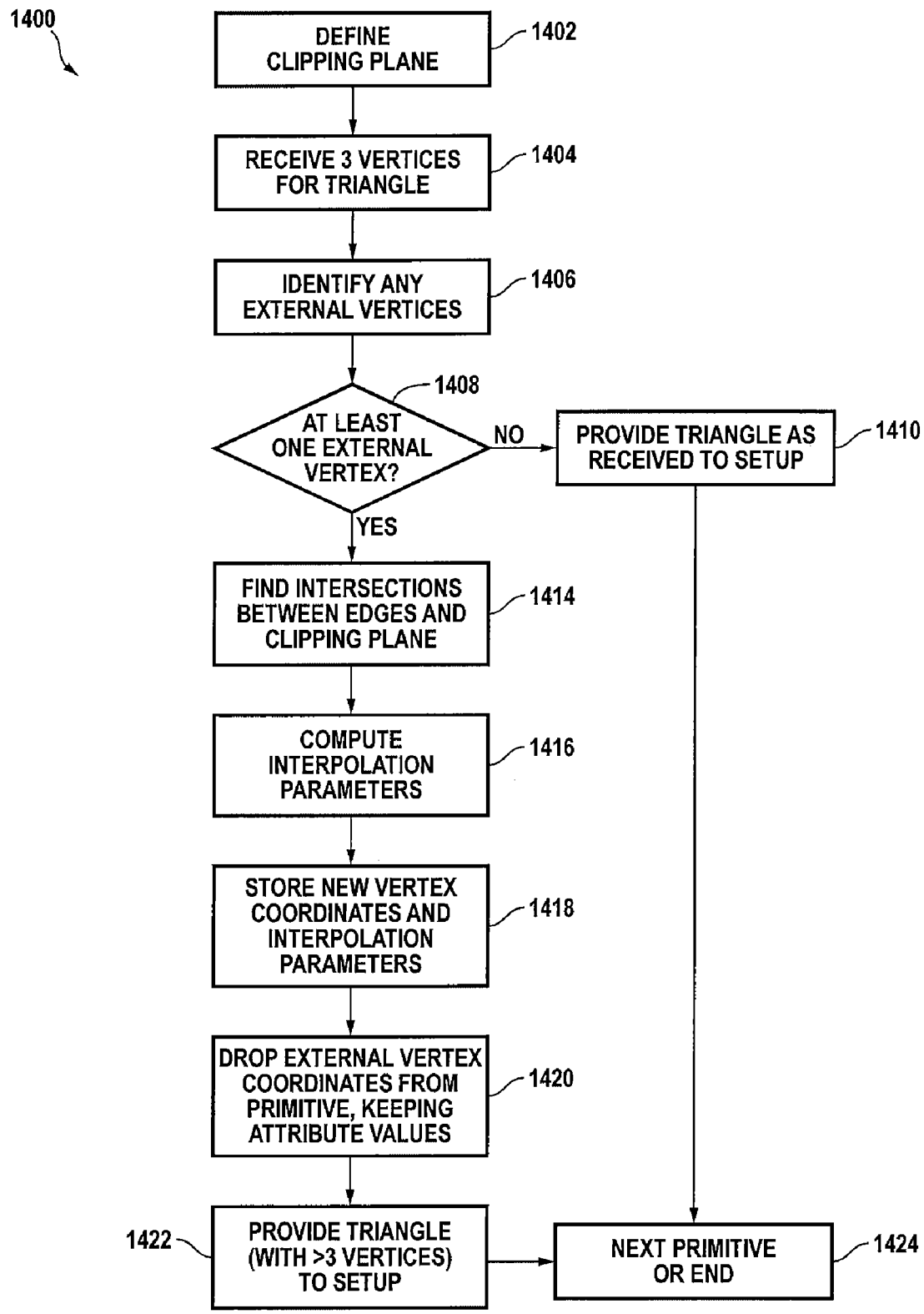
FIG. 14 is a flow diagram of a clipping process according to an alternative embodiment of the present invention.

FIG. 14 is a flow diagram of a clipping process 1400 that can be executed in VPC block 1304. At step 1402, a clipping plane (e.g., a near plane) is defined. As previously described, the clipping plane, which can be defined by an arbitrary plane equation in the clip coordinate space, has a visible side and an invisible side. As noted above, it is not critical whether the plane exactly matches a boundary of the view volume, and the clipping plane may be defined such that some of the geometry on the visible side is actually outside the view volume.

At step 1404, three vertices of a triangle are received. At step 1406, any invisible vertices are identified; as in other embodiments, conventional techniques may be used to determine whether each vertex is on the visible or invisible side of the clipping plane. At step 1408, if there are no invisible vertices, process 1400 proceeds to step 1410, where the triangle is provided to setup block 1306 without modification. Triangles with no visible vertices may or may not be culled at this stage, as described above. In either case, after providing the triangle to setup (if applicable), process 1400 proceeds to the next primitive or ends (step 1424).

Triangles with one or two invisible vertices are to be clipped. Accordingly, for such triangles, process 1400 proceeds to step 1414, where the intersection points between the edge lines of the triangle and the clipping plane are identified, similarly to step 414 of process 400 described above. A clipped vertex is created at each intersection point. Unlike process 400, process 1400 does not include computing attribute values for the clipped vertex. Instead, at step 1416, an interpolation parameter (or scale factor) s is computed for each clipped vertex. In one embodiment, the interpolation parameter s is defined as the fraction of the distance between the two vertices that is on the visible side of the clipping plane. For example, if $V_0$ is an invisible vertex, $V_1$ is a visible vertex, and P is the clipped vertex on the edge joining vertices $V_0$ and $V_1$, then:

$$s = D(V_1, P)/D(V_0, V_1), \qquad \text{(Eq. 4)}$$

where $D(V_0, V_1)$ is the distance (in the clip coordinate space) between vertices $V_0$ and $V_1$ and $D(V_1, P)$ is the distance between visible vertex $V_1$ and the intersection point P. At step 1418, each intersection point and its associated interpolation parameter s are added to the primitive. At step 1420, the coordinates for each invisible vertex may be dropped, but the attribute values are retained, unmodified. At step 1422, the primitive, with any additional clipped vertices, is provided to setup block 1306. Process 1400 then proceeds to the next primitive or ends (step 1424).

Referring again to FIG. 13, setup block 1306 receives the three or four vertex coordinates and generates three edge equations and a vertex list (vertices A, B, and C) for the plane equation. Setup block 1306 may be implemented similarly to setup block 306 (FIG. 3) described above and may also process point and line primitives as described therein.

Rasterizer 1308 receives edge equations from setup block 1306 and performs scan conversion. Rasterizer 1308 may be generally similar to rasterizer 308 described above.

Color assembly block 1310 receives the vertex list for the appropriate primitive from rasterizer 308 and generates attribute parameters or attribute values. Where a clipped vertex is used, its scale factor is included in the computation of the attribute. The parameterized equations are advantageously generated in the screen space. This may require conversion and the scale factor s from clip coordinates to screen coordinates. For example, if the clipping space is specified in homogenous coordinates (x, y, z, w), interpolation parameter s can be transformed to a scale factor S in inhomogeneous window coordinates (X, Y) as:

$$S = (w_{01}/w_0)*(1/s), \qquad \text{(Eq. 5)}$$

where $w_0$ is the w coordinate of the invisible vertex and $w_{01}$ is the w coordinate of the clipped vertex. In other embodiments, the scale factor may be computed after transformation to inhomogeneous screen coordinates. Parameterized attribute equations can be generated in a variety of ways, e.g., in accordance with Eq. 3 described above.

To compute the attribute values for an attribute U(X, Y), a planar interpolation similar to Eq. 3 can be used. As described above, any three points with known attribute values can be used to generate parameters for the attribute equation. Those skilled in the art will appreciate that two points with known attribute values are always available, even when one of the vertices is a clipped vertex for which attribute values are not computed.

Figure 15:
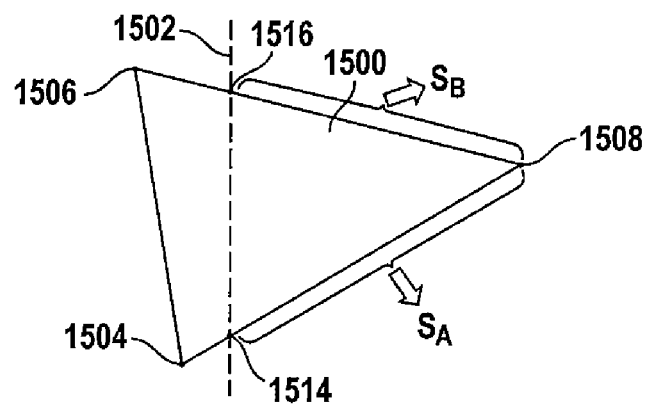
FIG. 15 illustrates an edge interpolation technique for computing an attribute value according to an embodiment of the present invention.

For instance, FIG. 15 shows a triangle 1500 that is clipped to a plane 1502. Triangle 1500 has invisible vertices 1504, 1506 and visible vertex 1508. During process 1400, clipped vertices 1514 and 1516 are created. Interpolation parameters $s_A$ and $s_B$ (representing the fraction of edges 1518, 1520 that are visible to clip plane 1502) are associated with clipped vertices 1514 and 1516, respectively, and can be converted to parameters $S_A$ and $S_B$ in screen coordinates according to Eq. 6 above. Suppose that invisible vertex 1504 has screen coordinates $(X_0, Y_0)$ and an attribute value $U_0$; visible vertex 1508 has screen coordinates $(X_1, Y_1)$ and an attribute value $U_1$; and clipped vertex 1516 has screen coordinates $(X_{01}, Y_{01})$. In principle, an attribute value $U_{01}$ at clipped vertex 1516 is known to be:

$$U_{01} = U_0*S_A + U_1*(1-S_A) \qquad \text{(Eq. 6)}$$

Similarly, an attribute value $U_{12}$ at clipped vertex 1518 can also be determined. Thus, sufficient information for generating attribute parameters is available.

Figure 16:
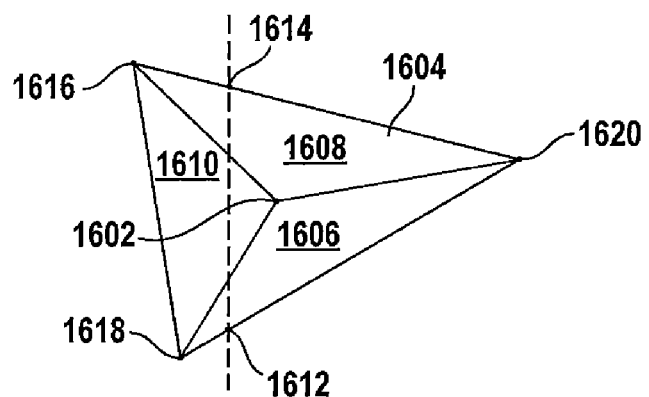
FIG. 16 illustrates a barycentric coordinate technique for computing an attribute value according to an embodiment of the present invention.

In an alternative embodiment of attribute computation, a parameterized attribute equation is provided with reference to barycentric coordinates within a triangle. FIG. 16 illustrates this case. For a point 1602 inside a triangle 1604, three subtriangles 1606, 1608, 1610 are defined. As is generally known in the art, barycentric coordinates (a, b, c) can be defined for point 1602 as:

$$a = \frac{\alpha(1606)}{\alpha(1604)}; \quad b = \frac{\alpha(1608)}{\alpha(1604)}; \quad c = \frac{\alpha(1610)}{\alpha(1604)}, \qquad \text{(Eq. 7)}$$

where $\alpha(1606)$ denotes the area (in screen coordinates) of subtriangle 1606, $\alpha(1604)$ denotes the area of triangle 1604, and so on. If $U_0$, $U_1$, and $U_2$ are the respective attribute values at vertices 1616, 1618, 1620, then attribute U at point 1602 can be computed by barycentric interpolation as:

$$U(a,b,c) = U_0*a + U_1*b + U_2*c. \qquad \text{(Eq. 8)}$$

In some cases, further weighting factors maybe introduced into Eq. 8 to account for foreshortening as is known in the art.

Where the triangle has been clipped (e.g., at points 1612 and 1614) in accordance with process 1400 described above, the vertex coordinates for invisible vertices 1616, 1618 are not available. Those skilled in the art will recognize that the screen coordinates of clip points 1612, 1614 and the scale factors (s or S, as appropriate) associated with each clipped edge can be used to compute the correct areas (i.e., accounting for the area of the clipped out portion of the triangle). For instance, the area of triangle 1604 can be computed from the cross product of two edges:

$$\alpha(1604) = \frac{1}{2}\|e0 \times e2\|, \quad \text{(Eq. 9)}$$

where e0 denotes edge 1622 (between points 1620 and 1616), and e2 denotes edge 1624 (between points 1620 and 1618). While edges e0 and e2 are not directly available where the coordinates of points 1616, 1618 were dropped, the respective clipping scale factors $S_0$ and $S_2$ (in screen coordinates) for edges e0 and e2 can be used to rescale the clipped edges e0' and e2':

$$e0 = S_0(e0'); \; e2 = S_2(e2'). \quad \text{(Eq. 10)}$$

Thus:

$$\alpha(1604) = \frac{1}{2} S_0 S_2 \|e0' \times e2'\|, \quad \text{(Eq. 11)}$$

and similarly for the other areas used in Eq. 7. In addition, those skilled in the art will recognize that other interpolation algorithms may also be implemented by using the scale factor to reconstruct the triangle geometry for edges that have been clipped.

Figure 17:
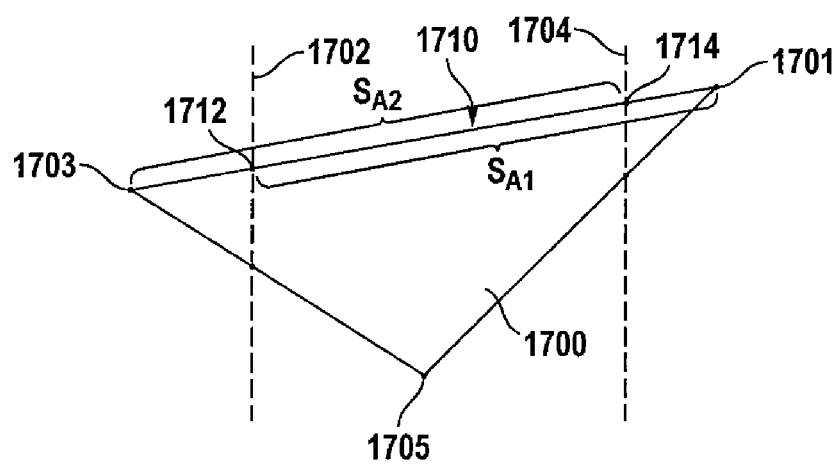
FIG. 17 illustrates clipping of a triangle that intersects two clipping planes according to an alternative embodiment of the present invention.

In some embodiments, clipping with an interpolation parameter can also be used to clip to multiple planes. FIG. 17 illustrates a triangle 1700 (with vertices 1701, 1703, 1705) that intersects two clipping planes 1702, 1704. In this instance, edges 1706, 1708 each intersect one of the clipping planes 1702, 1704 and can be clipped as described above. Edge 1710 intersects both clipping planes 1702, 1704. This case can be handled by defining an interpolation parameter for each clipping plane 1702, e.g., parameters $s_{A1}$, $s_{A2}$ as shown. New vertex coordinates are defined for intersection points 1712, 1714, but new attributes are not computed. Those skilled in the art will recognize that parameterized attribute equations can be generated from the locations of clipped vertices 1712, 1714, the interpolation parameters $s_{A1}$, $s_{A2}$, and the attribute values of the original vertices 1701 and 1703.

FURTHER EMBODIMENTS

While the invention has been described with respect to specific embodiments, one skilled in the art will recognize that numerous modifications are possible. For instance, any attributes or any number of attributes may be computed using the interpolation techniques described above. Some embodiments may clip lines in addition to triangles; as noted above, lines can always be clipped without creating new geometry. In addition, attributes of a clipped end point might or might not be computed; interpolation parameters as described above may be used.

Embodiment of the present invention may clip to any number of planes, including all planes of a view frustum or other view volume. A clipping plane need not coincide exactly with a boundary of the view volume; for instance, the clipping plane may be defined to provide a "guard band," which is a region on the visible side of the clip plane that is outside the view volume. Any geometry in the guard band is not clipped but can be removed during rasterization or subsequent processing as is known in the art. In addition to (or instead of) clipping to the view frustum, clipping to other planes, including arbitrary user-defined planes, may be performed. In some embodiments, other non-planar clipping surfaces may also be used.

Graphics processors embodying the present invention may be adapted for a variety of applications, including in general purpose computer systems, special purpose computer systems such as video game consoles, or any other graphics application. The clipping techniques described herein may be implemented in hardware (e.g., integrated circuit technologies), software adapted for execution on suitable processors, or any combination thereof.

Thus, although the invention has been described with respect to specific embodiments, it will be appreciated that the invention is intended to cover all modifications and equivalents within the scope of the following claims.

What is claimed is:

1. In a rendering pipeline configured for rendering an image from input geometry data including input triangles, a method for clipping an input triangle having three vertices to a first clipping surface that defines a first invisible region, the method comprising:
    identifying each of the three vertices as being invisible or not invisible based on whether that vertex is in the first invisible region;
    in the event that exactly one vertex of the input triangle is invisible, performing the acts of:
        defining a quadrangle having as vertices the two vertices of the input triangle that are not invisible and two clipped vertices, wherein each clipped vertex is located approximately at the intersection of the first clipping surface with one of the edges that terminates at the invisible vertex;
        selecting three vertices from the four vertices of the quadrangle; and
        computing a parameter value for an attribute equation using the three selected vertices, wherein the attribute equation defines a non-positional attribute and is used to determine at least in part the appearance of a pixel covered by the input triangle in the rendered image; and
        rendering the image using the quadrangle and the attribute equation.

2. The method of claim 1, further comprising:
    generating an edge equation for each of three edges of the quadrangle, wherein the three edges include a first edge and a second edge that each include one of the clipped vertices and a third edge that joins the two vertices that are not invisible; and
    using the edge equations to determine pixel coverage.

3. The method of claim 1, wherein the act of selecting three vertices includes:
    selecting a first one of the vertices of the quadrangle based on distances of each of the vertices of the quadrangle to an origin point; and
    selecting a second one and a third one of the vertices of the quadrangle based on respective distances of each of the vertices from the first vertex.

4. The method of claim 2, wherein defining a quadrangle includes computing a clipped attribute value for at least one of the clipped vertices.

5. The method of claim 4, further comprising computing an attribute value for a pixel that is determined to be covered using the parameter value and the clipped attribute value.

6. The method of claim 1, wherein the clipping surface is substantially planar.

7. The method of claim 6, wherein the clipping surface corresponds to a near plane of a view frustum.

8. The method of claim 1, wherein the clipping surface is positioned such that a guard band region that is outside a boundary of a view volume is not in the first region.

9. The method of claim 4, further comprising clipping the quadrangle to a second clipping surface that defines a second invisible region, wherein clipping to the second clipping surface includes:
identifying each vertex of the quadrangle that is in the second invisible region as being invisible; and
in the event that the exactly one vertex of the quadrangle is invisible, performing the acts of:
splitting the quadrangle into two polygons, the two polygons including a triangle, wherein the invisible vertex is a vertex of the triangle and is not a vertex of the other polygon; and
clipping the triangle that includes the invisible vertex.

10. The method of claim 1, further comprising, in the event that exactly two of the vertices of the input triangle are invisible:
defining a clipped triangle having as vertices the one vertex of the input triangle that is not invisible and two clipped vertices, wherein each clipped vertex is located approximately at the intersection of the clipping plane with one of the edges that terminates at one of the invisible vertices; and
generating a parameter value for an attribute equation using the three vertices of the clipped triangle.

11. In a rendering pipeline configured for rendering an image from input geometry data including input triangles, a method for clipping an input triangle having three vertices to a clipping surface that defines an invisible region, the method comprising:
identifying each of the three vertices as being invisible or not invisible based on whether that vertex is in the invisible region; and
in the event that at least one vertex of the input triangle is invisible, performing the acts of:
defining, for each edge of the input triangle that intersects the clipping surface, a clipped vertex located approximately at an intersection point between the edge and the clipping surface; and
computing an interpolation parameter for each clipped vertex as a function of distance along the edge from one of the vertices of the input triangle to the clipped vertex, wherein the interpolation parameters may be used to rescale attribute values for each clipped vertex in order to determine attribute values for non-clipped portions of the input triangle; and
rendering the image from the input geometry wherein the vertices of the input triangle identified as being invisible are not rendered.

12. The method of claim 11, further comprising computing a parameter value for an attribute equation using a vertex of the input triangle other than the invisible vertex, the clipped vertices, and the interpolation parameter for each clipped vertex.

13. The method of claim 11, further comprising:
generating an edge equation for each of three edges of the triangle using the clipped vertices and a vertex other than the invisible vertex; and
using the edge equations to determine pixel coverage.

14. The method of claim 13, further comprising computing an attribute value for a pixel that is determined to be covered using the parameter value and an attribute value of an invisible vertex.

15. A device for rendering an image from input geometry data including input triangles, the device comprising:
a clipping module configured to receive the input triangles and to clip the received triangles to a first clipping surface that defines a first invisible region, thereby generating clipped primitives, wherein the clipped primitives include a quadrangle having four vertices;
a setup module configured to receive the clipped primitives and to generate three edge equations and an ordered list of three vertices for each clipped primitive, including the quadrangle;
a rasterizer configured to receive the three edge equations for each clipped primitive, including the quadrangle, and to determine pixel coverage based at least in part on the edge equations; and
an attribute assembly module configured to generate a parameter value for an attribute equation from the ordered list of three vertices for each clipped primitive, including the quadrangle, wherein the attribute equation defines a non-positional attribute and is used to determine at least in part the appearance of a pixel covered by the input triangle in the rendered image.

16. The device of claim 15, wherein the clipping module is further configured such that a quadrangle is created from a received triangle in the event that the received triangle has exactly one vertex that is in the first invisible region.

17. The device of claim 15, wherein the rasterizer is further configured to operate in a homogeneous coordinate system.

18. The device of claim 15, wherein each clipped primitive has at least one clipped vertex and wherein the clipping module is further configured to compute a clipped attribute value for at least one of the clipped vertices.

19. The device of claim 18, further comprising a shader module configured to compute an attribute value for a pixel that is determined by the rasterizer to be covered, wherein the shader module is further configured to compute the attribute value using the parameter value from the attribute assembly module and the clipped attribute value.

20. The device of claim 15, wherein the clipping module is further configured to clip the clipped primitives to a second clipping surface that defines a second invisible region.

21. The device of claim 20, wherein the clipping module is further configured to split a quadrangle that has exactly one vertex in the second invisible region into two primitives during clipping to the second clipping surface, the two primitives including one triangle that has a vertex in the second invisible region and one other primitive that does not have a vertex in the second invisible region.

* * * * *